United States Patent
Grover et al.

(10) Patent No.: US 12,410,723 B2
(45) Date of Patent: Sep. 9, 2025

(54) NON-CONTACT SEAL FOR ROTATIONAL EQUIPMENT WITH RADIAL THROUGH-HOLE

(71) Applicant: United Technologies Corporation, Farmington, CT (US)

(72) Inventors: Eric A. Grover, Tolland, CT (US); Brian F. Hilbert, Coventry, CT (US)

(73) Assignee: RTX CORPORATION, Farmington, CT (US)

( * ) Notice: Subject to any disclaimer, the term of this patent is extended or adjusted under 35 U.S.C. 154(b) by 696 days.

(21) Appl. No.: 16/836,381

(22) Filed: Mar. 31, 2020

(65) Prior Publication Data

US 2021/0301925 A1    Sep. 30, 2021

(51) Int. Cl.
| | | |
|---|---|---|
| F16J 15/44 | (2006.01) | |
| F01D 11/02 | (2006.01) | |
| F01D 11/16 | (2006.01) | |
| F02C 7/28 | (2006.01) | |
| F16J 15/3208 | (2016.01) | |

(Continued)

(52) U.S. Cl.
CPC ............ *F01D 11/025* (2013.01); *F01D 11/16* (2013.01); *F16J 15/442* (2013.01); *F16J 15/445* (2013.01); *F02C 7/28* (2013.01); *F05D 2240/55* (2013.01); *F16J 15/3208* (2013.01); *F16J 15/3232* (2013.01); *F16J 15/3284* (2013.01)

(58) Field of Classification Search
CPC .................. F16J 15/3208; F16J 15/3232; F16J 15/3284; F16J 15/441; F16J 15/442; F16J 15/443; F16J 15/445; F01D 11/025; F01D 11/16; F05D 2240/55; F02C 7/28

See application file for complete search history.

(56) References Cited

U.S. PATENT DOCUMENTS

| | | | |
|---|---|---|---|
| 4,017,088 A | | 4/1977 | Lerjen |
| 4,998,739 A | * | 3/1991 | Weiler ................. F01D 11/025 415/231 |
| 6,145,843 A | | 11/2000 | Hwang |

(Continued)

FOREIGN PATENT DOCUMENTS

| | | |
|---|---|---|
| CA | 2403664 C | 7/2007 |
| CA | 2536362 C | 2/2013 |

(Continued)

OTHER PUBLICATIONS

EP search report for EP21165710.1 dated Aug. 31, 2021.

*Primary Examiner* — Christine M Mills
*Assistant Examiner* — L. Susmitha Koneru
(74) *Attorney, Agent, or Firm* — Getz Balich LLC

(57) ABSTRACT

An assembly is provided for rotational equipment. This assembly includes a plurality of seal shoes, a seal base and a plurality of spring elements. The seal shoes are arranged about a centerline in an annular array. The seal shoes include a first seal shoe configured with an aperture that extends radially through the first seal shoe. The seal base circumscribes the annular array of seal shoes. The spring elements include a first spring element. The first spring element includes a first mount, a second mount and a spring beam. The first mount is connected to the first seal shoe. The second mount is connected to the seal base. The spring beam extends laterally between and is connected to the first mount and the second mount.

17 Claims, 17 Drawing Sheets

(51) Int. Cl.
  *F16J 15/3232* (2016.01)
  *F16J 15/3284* (2016.01)

(56) References Cited

U.S. PATENT DOCUMENTS

| | | | |
|---|---|---|---|
| 6,226,975 B1 | 5/2001 | Ingistov | |
| 7,410,173 B2 | 8/2008 | Justak | |
| 7,726,660 B2 | 6/2010 | Datta | |
| 7,896,352 B2 | 3/2011 | Justak | |
| 8,002,285 B2 | 8/2011 | Justak | |
| 8,172,232 B2 * | 5/2012 | Justak | F16J 15/442 |
| | | | 277/411 |
| 8,641,045 B2 | 2/2014 | Justak | |
| 8,919,781 B2 | 12/2014 | Justak | |
| 9,045,994 B2 | 6/2015 | Bidkar | |
| 9,115,810 B2 | 8/2015 | Bidkar | |
| 9,145,785 B2 | 9/2015 | Bidkar | |
| 9,255,642 B2 | 2/2016 | Bidkar | |
| 9,359,908 B2 * | 6/2016 | Bidkar | F01D 11/02 |
| 9,587,746 B2 | 3/2017 | Bidkar | |
| 10,030,531 B2 | 7/2018 | Peters | |
| 10,082,039 B2 | 9/2018 | Hanson | |
| 10,094,232 B2 | 10/2018 | McCaffrey | |
| 10,190,431 B2 * | 1/2019 | Bidkar | F16J 15/447 |
| 10,208,615 B2 | 2/2019 | Peters | |
| 2003/0080513 A1 | 5/2003 | Kirby, III | |
| 2008/0265513 A1 * | 10/2008 | Justak | F16J 15/442 |
| | | | 277/411 |
| 2013/0259660 A1 | 10/2013 | Dale | |
| 2013/0315721 A1 * | 11/2013 | Lawson, Jr. | F01D 25/30 |
| | | | 415/182.1 |
| 2014/0008871 A1 | 1/2014 | Bidkar | |
| 2014/0050564 A1 | 2/2014 | Hagan | |
| 2014/0062024 A1 | 3/2014 | Bidkar | |
| 2014/0119912 A1 | 5/2014 | Bidkar | |
| 2016/0010480 A1 * | 1/2016 | Bidkar | F01D 11/025 |
| | | | 277/303 |
| 2016/0102570 A1 | 4/2016 | Wilson | |
| 2016/0109025 A1 | 4/2016 | McCaffrey | |
| 2016/0115804 A1 | 4/2016 | Wilson | |
| 2016/0115805 A1 | 4/2016 | Gibson | |
| 2016/0130963 A1 | 5/2016 | Wilson | |
| 2017/0211406 A1 * | 7/2017 | Peters | F03B 3/12 |
| 2018/0058240 A1 | 3/2018 | Chuong | |
| 2018/0372229 A1 * | 12/2018 | Bidkar | F16J 15/445 |

FOREIGN PATENT DOCUMENTS

| | | |
|---|---|---|
| CA | 2675597 C | 5/2015 |
| DE | 426658 | 3/1926 |
| DE | 19735932 C1 | 2/1999 |
| EP | 1942294 A1 | 7/2008 |
| EP | 2299062 A1 | 3/2011 |
| EP | 2137383 B1 | 12/2013 |
| EP | 2279364 B1 | 4/2014 |
| EP | 2286119 B1 | 7/2017 |
| JP | 61108808 | 5/1986 |
| WO | 2008094761 A1 | 8/2008 |
| WO | 2014150825 A1 | 9/2014 |
| WO | 2016179608 A2 | 11/2016 |

* cited by examiner

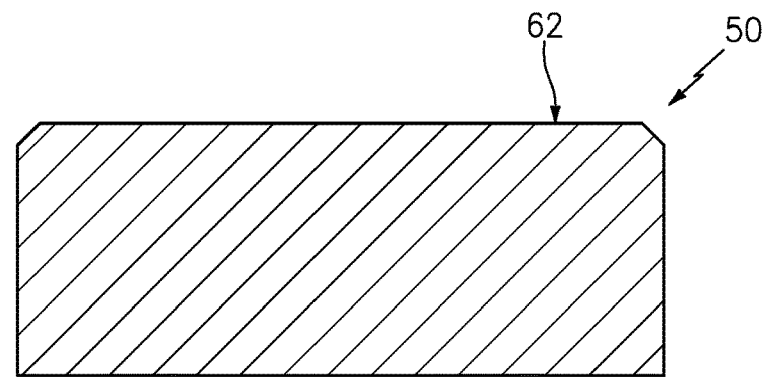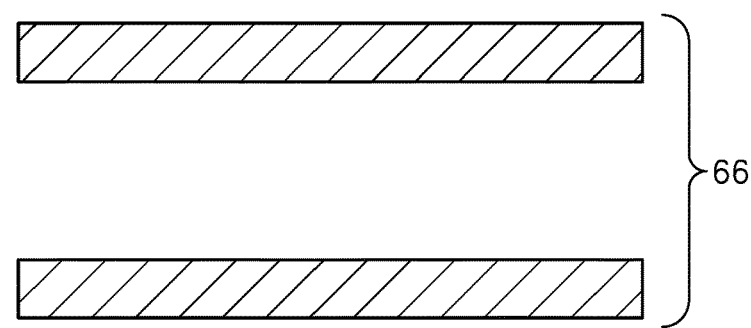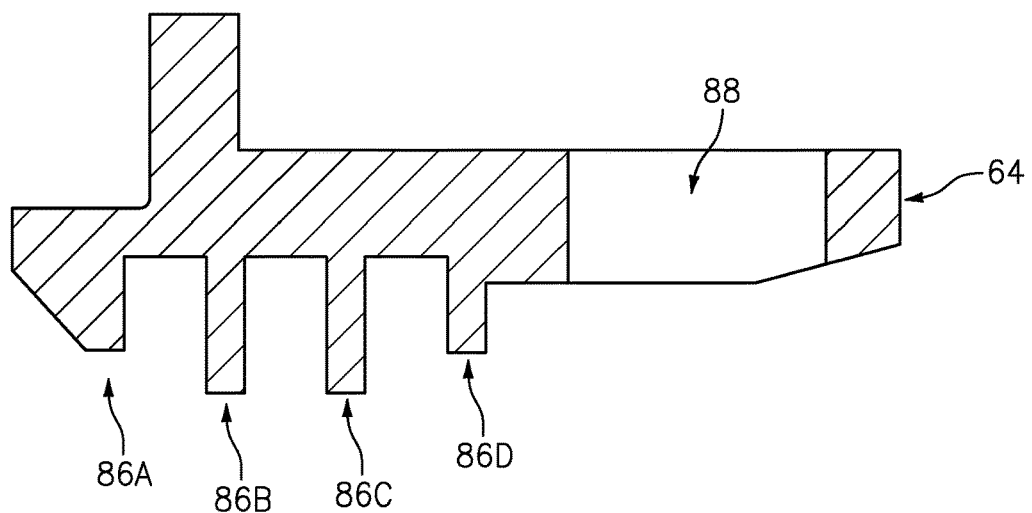
FIG. 6

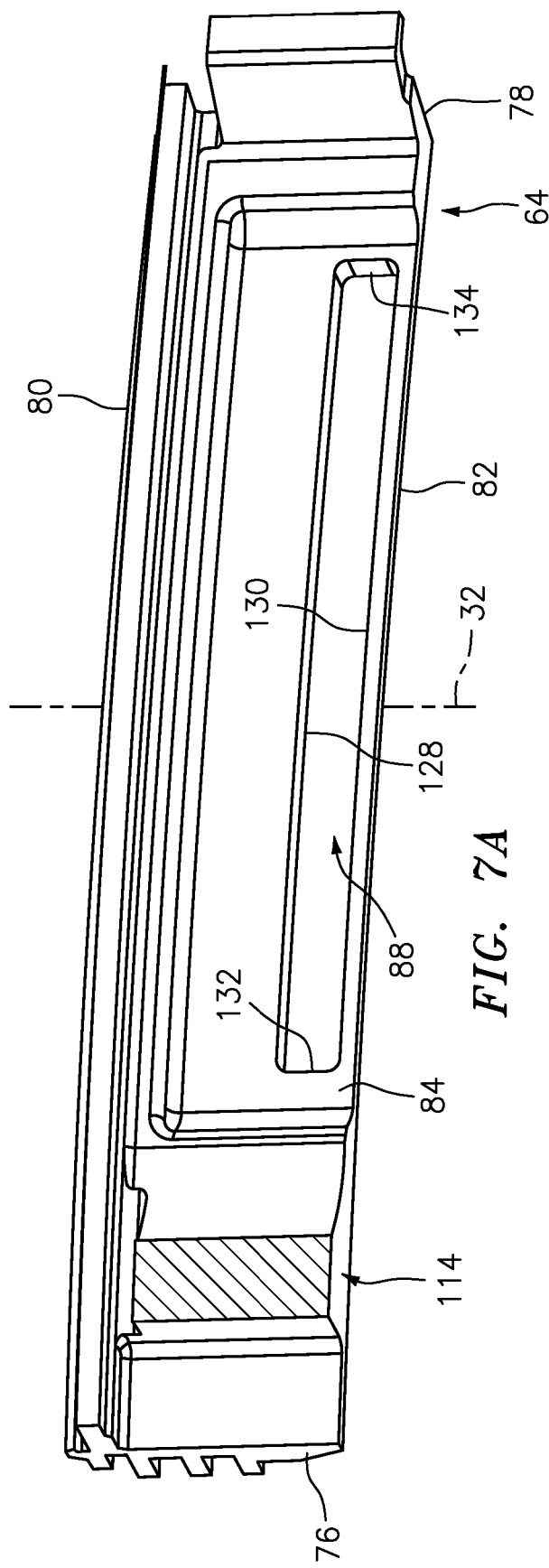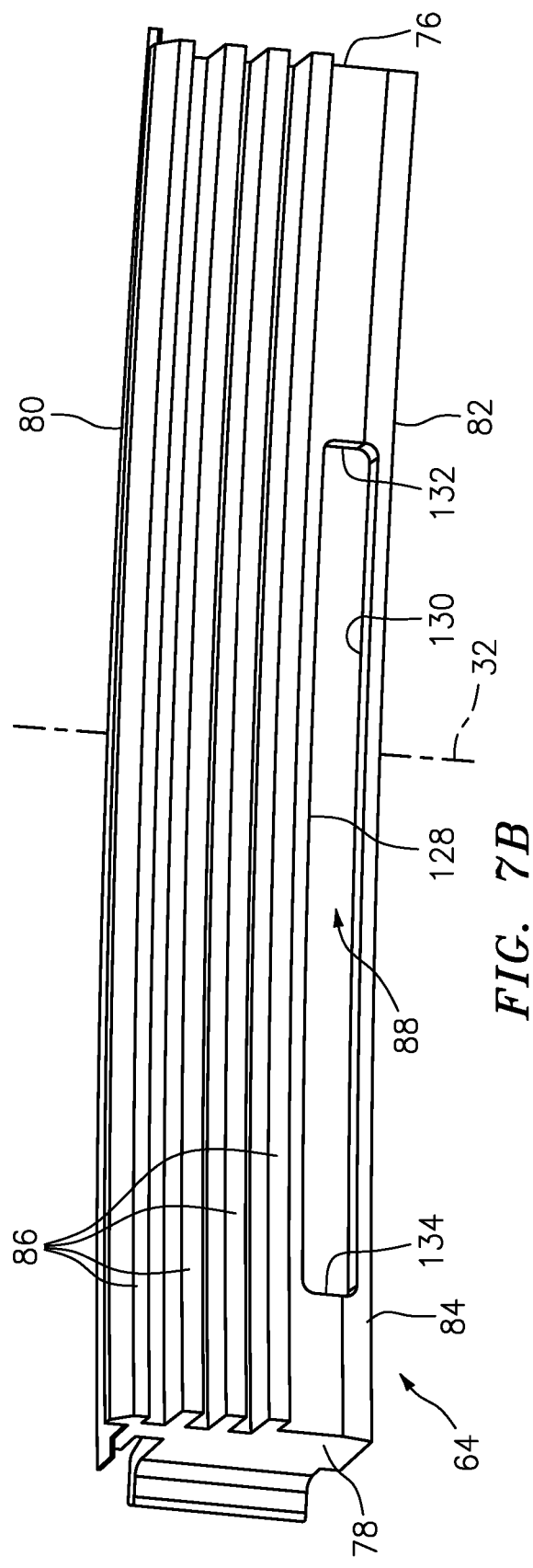
FIG. 7A
FIG. 7B

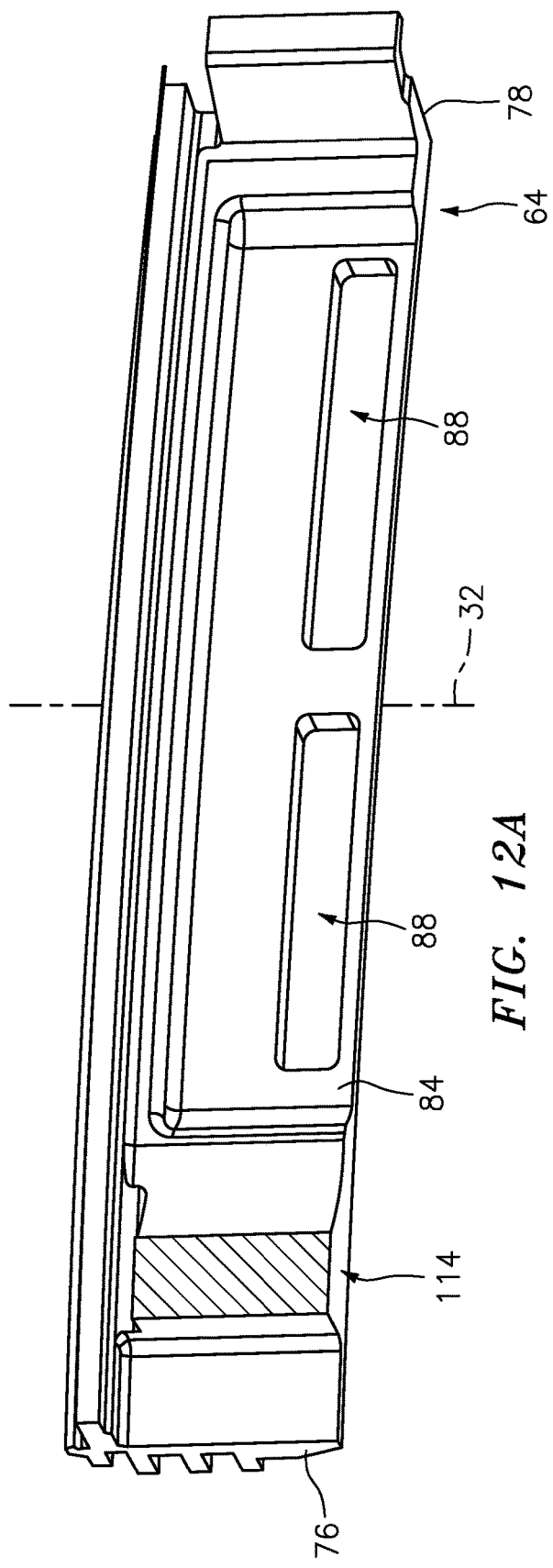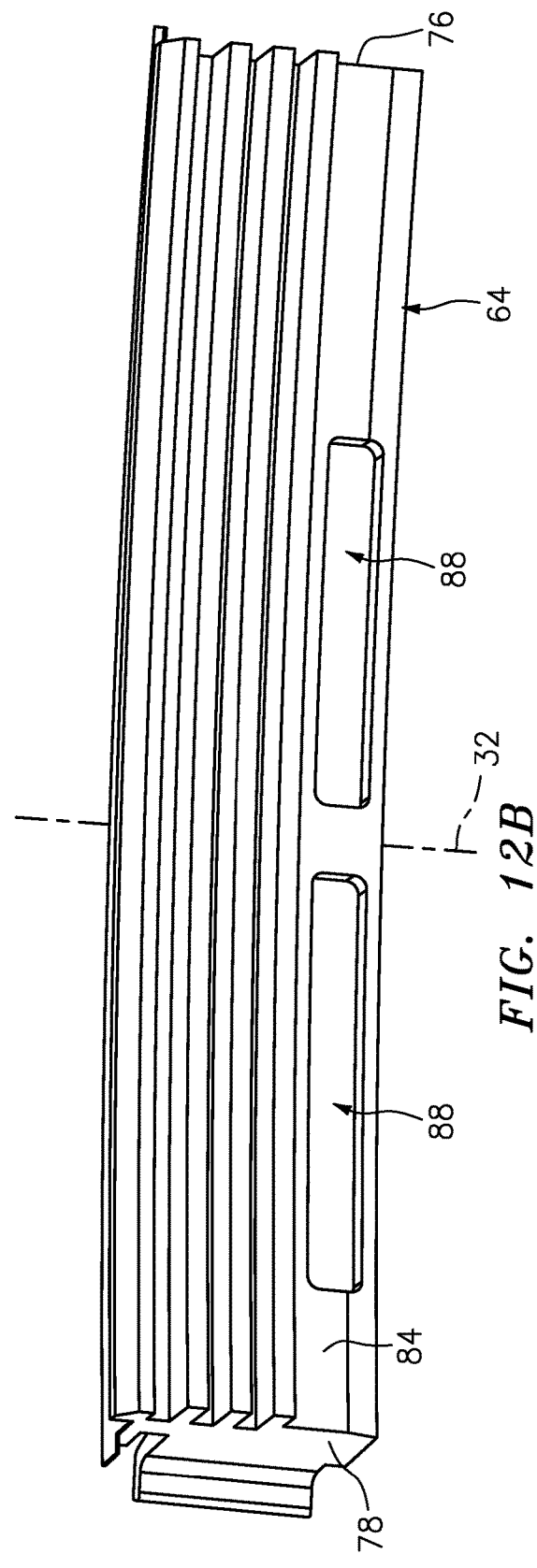
FIG. 12A
FIG. 12B

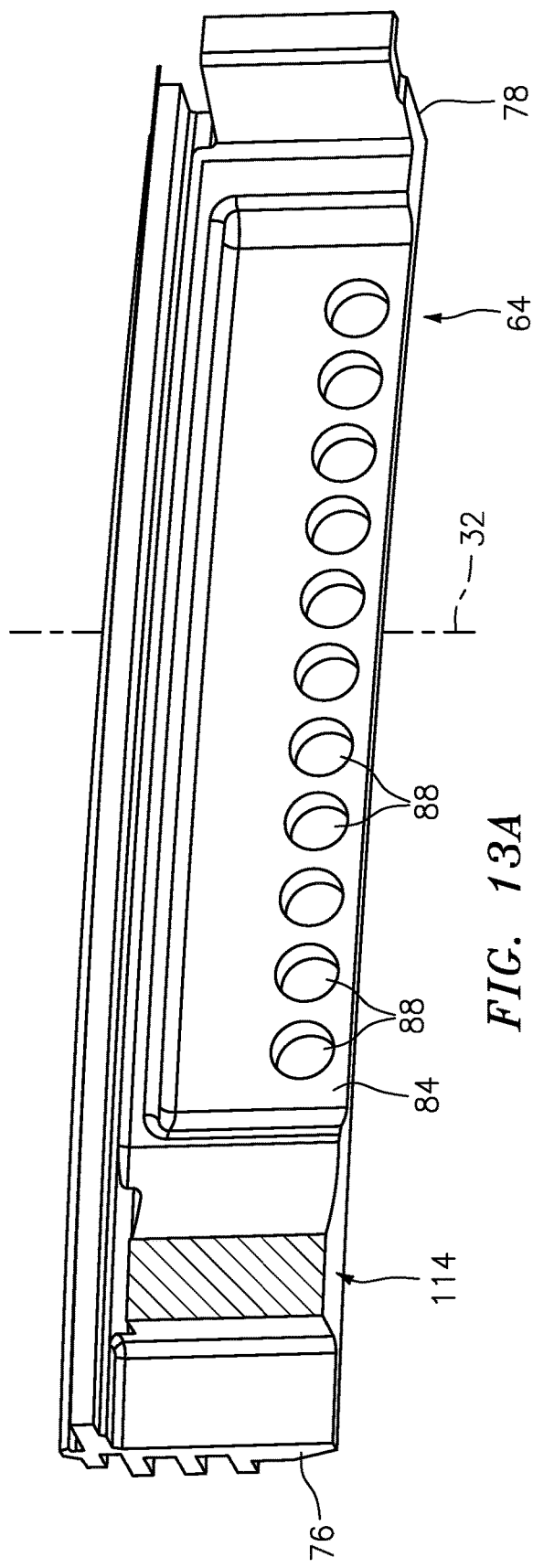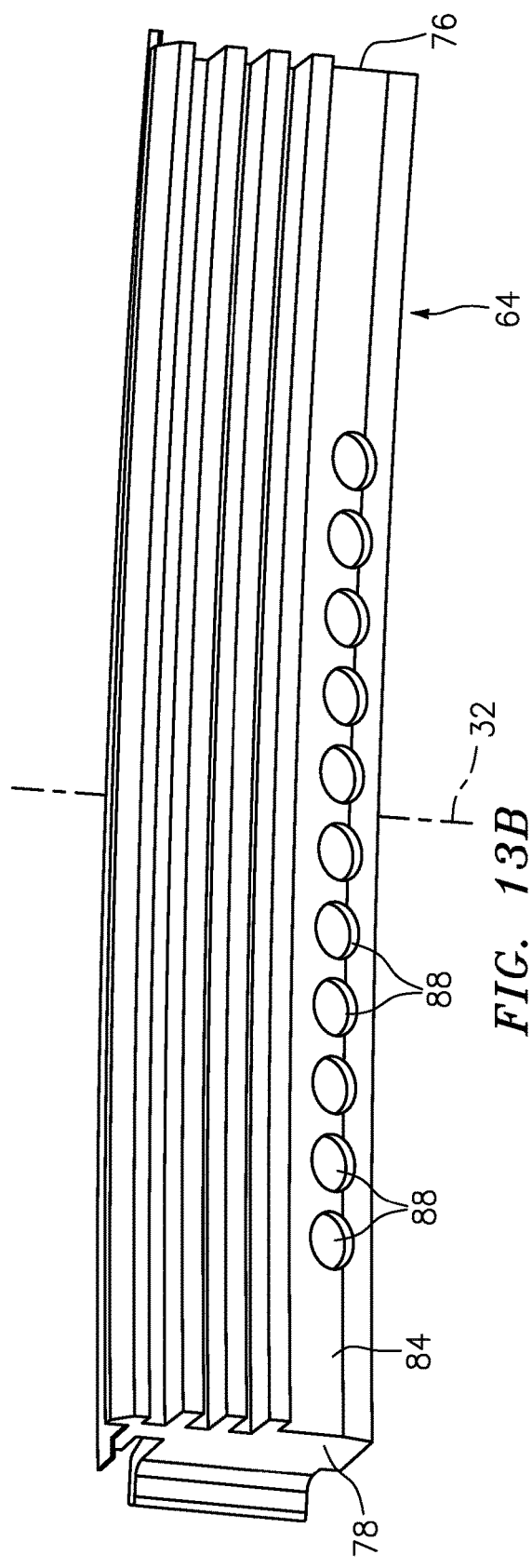

NON-CONTACT SEAL FOR ROTATIONAL EQUIPMENT WITH RADIAL THROUGH-HOLE

BACKGROUND OF THE DISCLOSURE

1. Technical Field

This disclosure relates generally to rotational equipment and, more particularly, to a non-contact seal for rotational equipment.

2. Background Information

Rotational equipment typically includes one or more seal assemblies for sealing gaps between rotors and stators. A typical seal assembly includes a contact seal with a seal element such as a knife edge seal that engages a seal land. Such a contact seal can generate a significant quantity of heat that can reduce efficiency of the rotational equipment as well as subject other components of the rotational equipment to high temperatures and internal stresses. To accommodate these high temperatures and stresses, certain components of the rotational equipment may be constructed from specialty high temperature materials. However, these materials can significantly increase manufacturing and servicing costs as well as mass of the rotational equipment. While non-contact seals have been developed in an effort to reduce heat within rotational equipment, there is still room for improvement to provide an improved non-contact seal. In particular, there is room in the art for a non-contact seal with improved damping characteristics.

SUMMARY OF THE DISCLOSURE

According to an aspect of the present disclosure, an assembly is provided for rotational equipment. This assembly includes a plurality of seal shoes, a seal base and a plurality of spring elements. The seal shoes is arranged about a centerline in an annular array. The seal shoes include a first seal shoe configured with an aperture that extends radially through the first seal shoe. The seal base circumscribes the annular array of seal shoes. The spring elements include a first spring element. The first spring element includes a first mount, a second mount and a spring beam. The first mount is connected to the first seal shoe. The second mount is connected to the seal base. The spring beam extends laterally between and is connected to the first mount and the second mount.

According to another aspect of the present disclosure, another assembly is provided for rotational equipment. This assembly includes a plurality of seal shoes, a seal base and a plurality of spring elements. The seal shoes are arranged around a centerline and include a first seal shoe. The first seal shoe extends axially along the centerline between a seal shoe first side and a seal shoe second side. The first seal shoe includes a plurality of projections and an aperture. The projections are arranged into a grouping which is asymmetrically arranged axially along the centerline between the seal shoe first side and the seal shoe second side. The aperture extends radially through the first seal shoe. The aperture is located axially between the grouping and the seal shoe second side. The seal base circumscribes the seal shoes. The spring elements include a first spring element which is connected to and extends between the first seal shoe and the seal base.

According to still another aspect of the present disclosure, still another assembly is provided for rotational equipment. This assembly includes a plurality of seal shoes, a seal base and a plurality of spring elements. The seal shoes are arranged about a centerline and include a first seal shoe. The first seal shoe includes a base, a plurality of projections and an aperture. The base extends axially along the centerline between a first side of the first seal shoe and a second side of the first seal shoe. Each of the projections extends radially inward from the base. The projections include a first projection and a second projection. The first projection and the second projection are located axially between the first side of the first seal shoe and an axial midpoint of the first seal shoe. The aperture extends radially through the base. The aperture is located axially between the projections and the second side of the first seal shoe. The seal base circumscribes the seal shoes. The spring elements include a first spring element that is connected to and extends between the first seal shoe and the seal base.

The aperture may extend axially within the first seal shoe.

The aperture may extend axially into the first seal shoe.

The aperture may extend laterally within the first seal shoe.

The aperture may extend laterally into the first seal shoe.

The aperture may be located laterally between the first mount and the second mount.

The first mount may be located laterally between the second mount and the aperture.

The aperture may be configured with an elongated cross-sectional geometry.

The aperture may be configured with a circumferentially symmetric cross-sectional geometry.

The aperture may be configured with a circular cross-sectional geometry.

The first seal shoe may also be configured with a second aperture that extends radially through the first seal shoe.

The first seal shoe may include a base and a plurality of projections. The base may extend axially along the centerline between a first side of the first seal shoe and a second side of the first seal shoe. Each of the projections extends radially inward from the base. The aperture may extend radially through the base and/or may be located axially between the second side of the first seal shoe and the projections.

The projections may include a first projection and a second projection. The first projection and the second projection may be located axially between the first side of the first seal shoe and an axial center of the first seal shoe.

The projections may also include a third projection. The third projection may be further located axially between the first side of the first seal shoe and the axial center of the first seal shoe.

The first seal shoe may extend laterally between a first end of the first seal shoe and a second end of the first seal shoe for a seal shoe length. The aperture may extend laterally for an aperture length which is between fifty percent and eighty percent of the seal shoe length.

The first seal shoe may extend laterally between a first end of the first seal shoe and a second end of the first seal shoe for a seal shoe length. The aperture may extend laterally for an aperture length which is between ten percent and fifty percent of the seal shoe length.

The first seal shoe may extend laterally between a first end of the first seal shoe and a second end of the first seal shoe for a seal shoe length. The aperture may extend laterally for an aperture length which is between one percent and ten percent of the seal shoe length.

The first spring element may also include a second spring beam that extends laterally between and is connected to the first mount and the second mount.

The assembly may also include a stationary structure, a rotating structure and a seal assembly. The rotating structure may be configured to rotate about the centerline. The seal assembly may include the seal shoes, the seal base and the spring elements. The seal assembly may be configured to seal a gap between the stationary structure and the rotating structure. The seal shoes may be arranged circumferentially about and may sealingly engage the rotating structure. The seal base may be mounted to the stationary structure.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 6 is a partial side sectional illustration of the primary seal device configured with alternative projections.

FIGS. 7A and 7B are perspective illustrations of a seal shoe for the primary seal device configured with an aperture.

FIGS. 12A and 12B are perspective illustrations of the seal shoe configured with a plurality of apertures.

FIGS. 13A and 13B are perspective illustrations of the seal shoe configured with alternative apertures.

DETAILED DESCRIPTION

Figure 1:
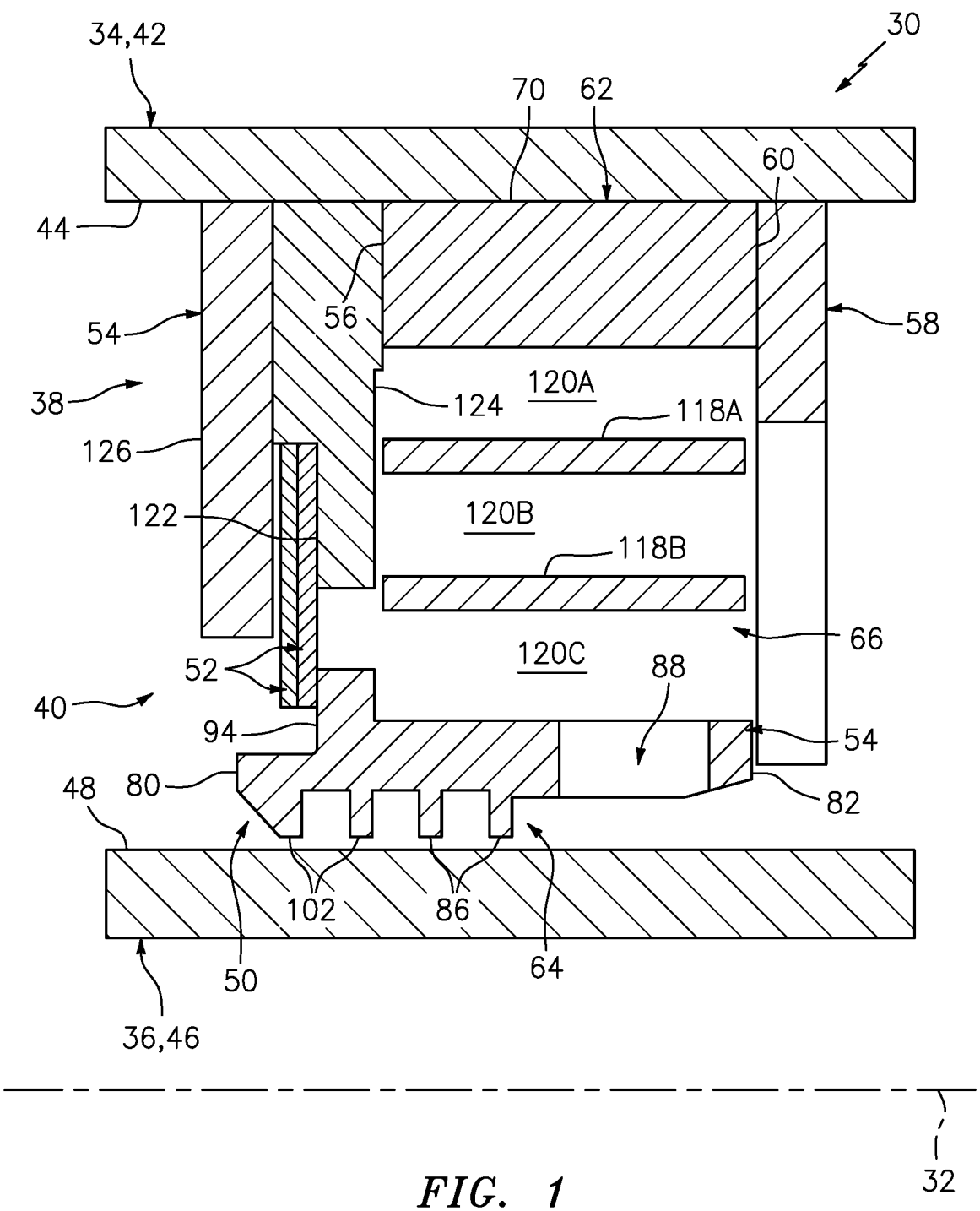
FIG. 1 is a partial side sectional illustration of an assembly for rotational equipment.

FIG. 1 illustrates an assembly 30 for rotational equipment with an axial centerline 32, which centerline 32 may also be an axis of rotation (e.g., a rotational axis) for one or more components of the rotational equipment assembly 30. An example of such rotational equipment is a gas turbine engine for an aircraft propulsion system, an exemplary embodiment of which is described below in further detail (e.g., see FIG. 21). However, the rotational equipment assembly 30 of the present disclosure is not limited to such an aircraft or gas turbine engine application. The rotational equipment assembly 30, for example, may alternatively be configured with rotational equipment such as an industrial gas turbine engine, a wind turbine, a water turbine or any other apparatus in which a seal is provided between a stationary structure and a rotating structure; e.g., a rotor.

The assembly 30 of FIG. 1 includes a stationary structure 34, a rotating structure 36 and a seal assembly 38 such as, for example, an adaptable non-contact seal assembly. The seal assembly 38 is mounted with the stationary structure 34 and configured to substantially seal an annular gap 40 between the stationary structure 34 and the rotating structure 36 as described below in further detail.

The stationary structure 34 includes a seal carrier 42. This seal carrier 42 may be a discrete, unitary annular body. Alternatively, the seal carrier 42 may be configured with another component/portion of the stationary structure 34. The seal carrier 42 has a seal carrier inner surface 44. This seal carrier inner surface 44 may be substantially cylindrical. The seal carrier inner surface 44 extends circumferentially about (e.g., completely around) and faces towards the axial centerline 32. The seal carrier inner surface 44 at least partially forms a bore in the stationary structure 34. This bore is sized to receive the seal assembly 38, which may be fixedly attached to the seal carrier 42 by, for example, a press fit connection between the seal assembly 38 and the seal carrier inner surface 44. The seal assembly 38, of course, may also or alternatively be fixedly attached to the seal carrier 42 using one or more other techniques/devices.

The rotating structure 36 includes a seal land 46. This seal land 46 may be a discrete, unitary annular body. For example, the seal land 46 may be mounted to a shaft of the rotating structure 36. Alternatively, the seal land 46 may be configured with another component/portion of the rotating structure 36. For example, the seal land 46 may be an integral part of a shaft of the rotating structure 36, or another component mounted to the shaft.

The seal land 46 of FIG. 1 has an outer seal land surface 48. This outer seal land surface 48 may be substantially cylindrical. The outer seal land surface 48 extends circumferentially about (e.g., completely around) and faces away from the axial centerline 32. The outer seal land surface 48 is configured to face towards and is axially aligned with the seal carrier inner surface 44. While FIG. 1 illustrates the outer seal land surface 48 and the seal carrier inner surface 44 with approximately equal axial lengths along the axial centerline 32, the outer seal land surface 48 may alternatively be longer or shorter than the seal carrier inner surface 44 in other embodiments.

Figure 2:
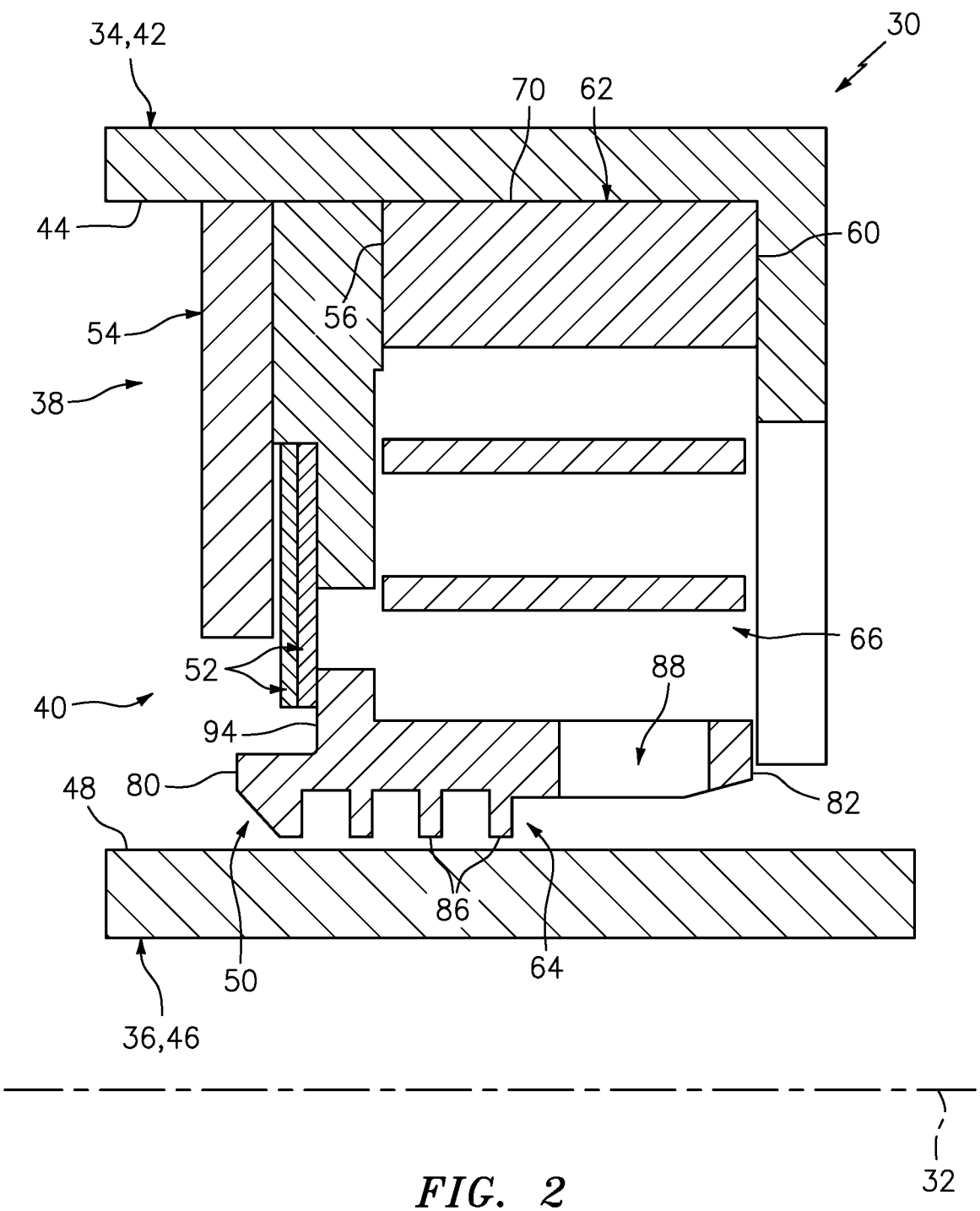
FIG. 2 is a partial side sectional illustration of the assembly configured with an alternative stationary structure.

The seal assembly 38 includes a primary seal device 50 and one or more secondary seal devices 52. The seal assembly 38 also includes one or more additional components for positioning, supporting and/or mounting one or more of the seal devices with the stationary structure 34. The seal assembly 38 of FIG. 1, for example, includes a first ring structure 54 configured for positioning, supporting and/or mounting the secondary seal devices 52 relative to the primary seal device 50. This first ring structure 54 may also be configured for axially positioning and/or supporting an axial first side surface 56 of the primary seal device 50 relative to the stationary structure 34. The seal assembly 38 of FIG. 1 also includes a second ring structure 58 (e.g., a scalloped support ring/plate) configured for axially positioning and/or supporting an axial second side surface 60 of the primary seal device 50 relative to the stationary structure 34. However, the second ring structure 58 may be omitted where, for example, the second side surface 60 of the primary seal device 50 is abutted against another component/portion of the stationary structure 34 (e.g., an annular or castellated shoulder) or otherwise axially positioned/secured with the stationary structure 34; e.g., see FIG. 2.

Figure 3:
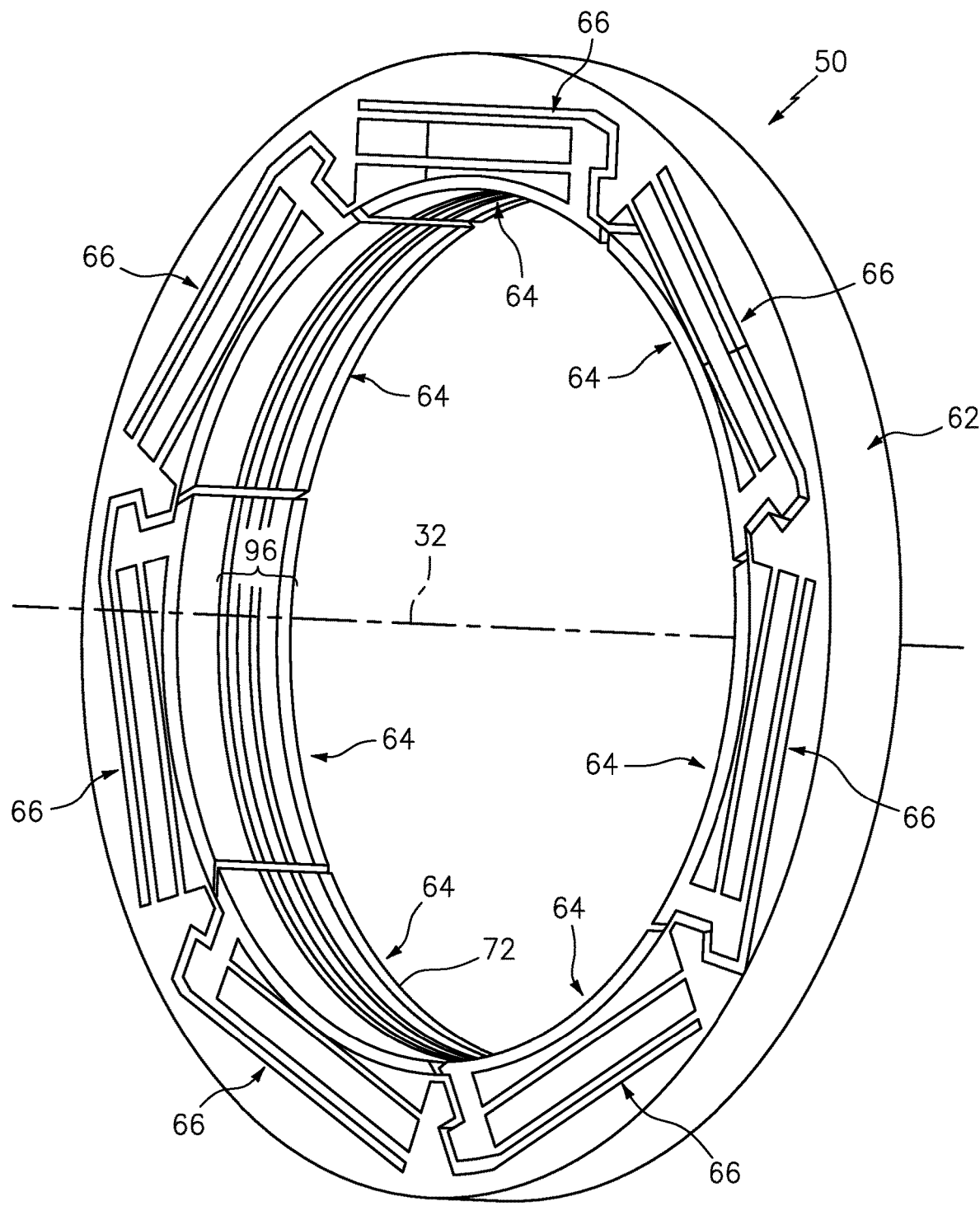
FIG. 3 is a perspective general schematic illustration of a primary seal device for the assembly.

Referring to FIG. 3, the primary seal device 50 is configured as an annular seal device such as, but not limited to, a non-contact hydrostatic seal device. The primary seal device 50 includes a seal base 62, a plurality of seal shoes 64, a plurality of spring elements 66 (see also FIGS. 4 and 5).

Figure 4:
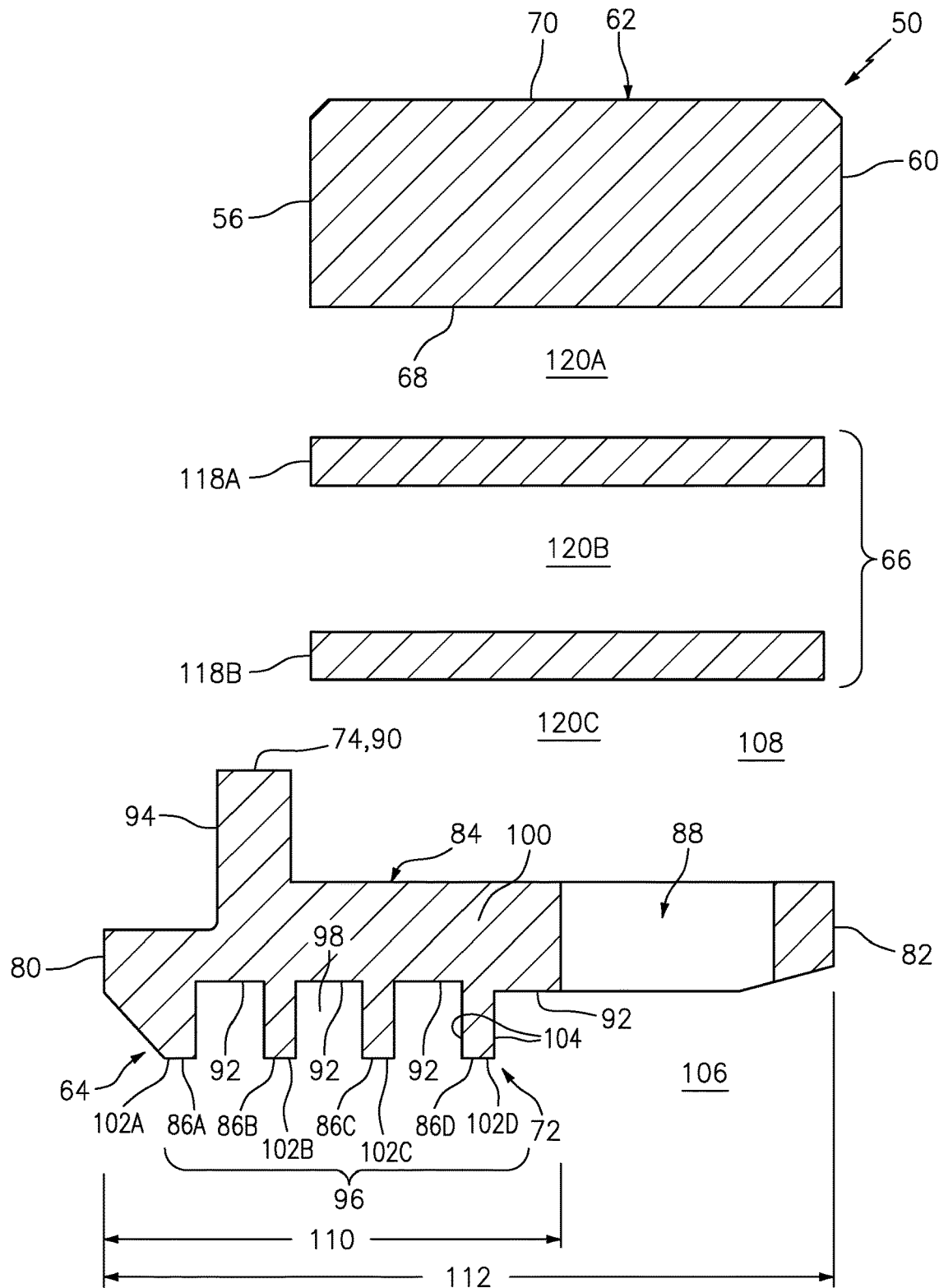
FIG. 4 is a partial side sectional illustration of the primary seal device.

The seal base 62 may be configured as an annular full hoop body. The seal base 62 of FIG. 2 extends circumferentially about (e.g., completely around) the axial centerline 32. The seal base 62 is configured to extend circumferentially around and thereby circumscribe and support the seal shoes 64 as well as the spring elements 66. Referring to FIG. 4, the seal base 62 extends axially along the axial centerline 32 between and forms the first side surface 56 and the second side surface 60. The seal base 62 extends radially between a seal base inner side 68 and a seal base outer side 70. The seal base outer side 70 radially engages (e.g., is press fit against or otherwise contacts) the stationary structure 34 and its inner surface 44 as shown in FIG. 1.

Referring to FIG. 3, the seal shoes 64 may be configured as arcuate bodies and are arranged circumferentially around the axial centerline 32 in an annular array. Each seal shoe 64, for example, is arranged circumferentially between and next to a pair of adjacent circumferentially neighboring seal shoes 64. The annular array of the seal shoes 64 extends circumferentially about (e.g., completely around) the axial centerline 32, thereby forming an inner bore at an inner side 72 of the primary seal device 50. As best seen in FIG. 1, the inner bore is sized to receive the seal land 46, where the rotating structure 36 projects axially through (or into) the inner bore formed by the seal shoes 64.

Figure 5:
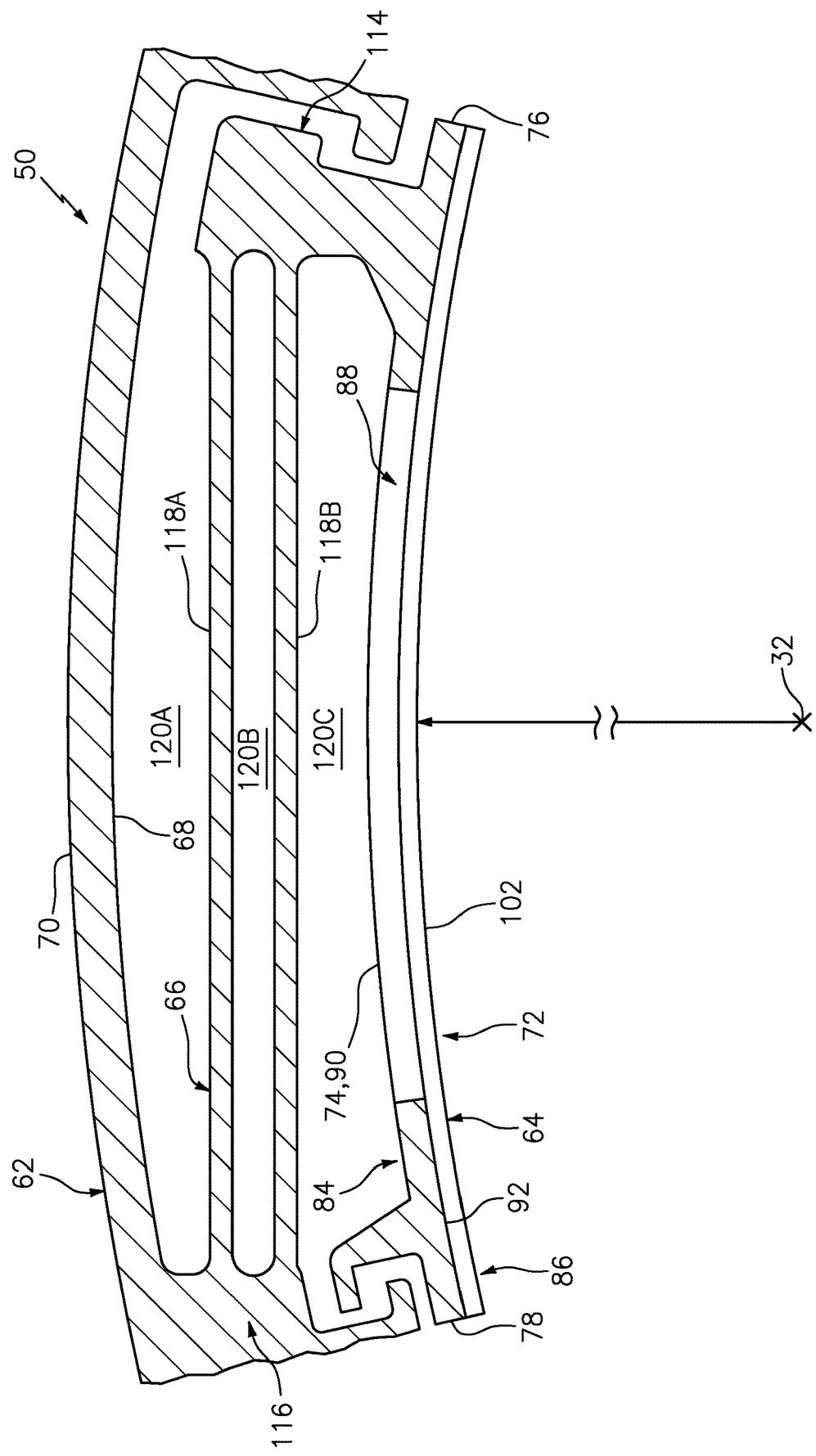
FIG. 5 is a cross-sectional illustration of a portion of the primary seal device.

Referring to FIG. 5, each of the seal shoes 64 extends radially from the inner side 72 of the primary seal device 50 to an outer side 74 of that seal shoe 64. Each of the seal shoes 64 extends circumferentially about the axial centerline 32 between opposing first and second ends 76 and 78 of that seal shoe 64. Referring to FIG. 4, each of the seal shoes 64 extends axially along the axial centerline 32 between a first (e.g., upstream) side 80 and a second (e.g., downstream) side 82 of the seal shoe 64. The seal shoe first side 80 may be an upstream side relative, for example, to flow of leakage fluid across the primary seal device 50. The seal shoe first side 80 may be axially offset from and project axially away from the axial first side surface 56. The seal shoe second side 82 may be a downstream side relative, for example, to the flow of leakage fluid across the primary seal device 50. The seal shoe second side 82 may be axially aligned with the second side surface 60. The seal shoes 64 of the present disclosure, however, are not limited to such exemplary relationships.

Each of the seal shoes 64 includes a seal shoe base 84, one or more seal shoe projections 86A-D (generally referred to as "86") (e.g., rails/teeth) and at least one aperture 88 (e.g., through hole). The seal shoe base 84 is disposed at (e.g., on, adjacent or proximate) the seal shoe outer side 74. The seal shoe base 84 of FIG. 5, for example, includes a (e.g., arcuate) base outer surface 90 at the outer side 74. Referring to FIG. 4, the seal shoe base 84 extends radially between the base outer surface 90 and one or more (e.g., arcuate) base inner surfaces 92. Each of these base inner surfaces 92 may be an arcuate surface. Referring to FIG. 5, the seal shoe base 84 extends circumferentially about the axial centerline 32 between the seal shoe first end 76 and the seal shoe second end 78. The seal shoe base 84 includes a first end surface at the seal shoe first end 76 and a second end surface at the seal shoe second end 78. Each of the end surfaces may be a flat planar surface. Each of the end surfaces, for example, may have a straight sectional geometry when viewed, for example, in a plane perpendicular to the axial centerline 32; e.g., the plane of FIG. 5. Referring to FIG. 4, the seal shoe base 84 extends axially between the seal shoe first side 80 and the seal shoe second side 82.

The seal shoe base 84 includes a (e.g., arcuate) side surface 94 generally at the seal shoe first side 80. In the array, these side surfaces 94 collectively form a generally annular, but circumferentially segmented, side surface configured for sealingly engaging with (e.g., contacting) the secondary seal devices 52 as shown in FIG. 1. The seal shoes 64 of the present disclosure, however, are not limited to the foregoing exemplary configuration.

Referring to FIG. 4, the seal shoe projections 86 are arranged at discrete axial locations along the axial centerline 32 and the seal shoe base 84. Each pair of axially adjacent/neighboring projections 86 may thereby be axially separated by an (e.g., arcuate) inter-projection gap. The seal shoe projections 86 of FIG. 4 are configured parallel to one another.

The seal shoe projections 86 may be arranged in a concentrated grouping 96. This grouping 96 may be asymmetrically arranged axially along the centerline 32 between the seal shoe first side 80 and the seal shoe second side 82. For example, an axial center 98 (e.g., midpoint) of the grouping 96 of the seal shoe projections 86 in FIG. 4 is arranged closer to the seal shoe first side 80 than the seal shoe second side 82. More particularly, the axial center 98 is disposed axially between the seal shoe first side 80 and an axial center 100 (e.g., midpoint) of the respective seal shoe 64 and its seal shoe base 84. As a result, one or more or each of the seal shoe projections 86 (e.g., projections 86A-C) may be located axially along the centerline 32 between the seal shoe first side 80 and the axial center 100. The seal shoe projections 86 of the present disclosure, however, are not limited to the foregoing exemplary asymmetric configuration.

The seal shoe projections 86 are connected to (e.g., formed integral with or otherwise attached to) the seal shoe base 84. Each of the seal shoe projections 86 projects radially inwards from the seal shoe base 84 and its base inner surfaces 92 to a distal projection end.

Each of the seal shoe projections 86 has a projection inner surface 102A-D (generally referred to as "102") at the distal projection end. One or more or each of the projection inner surfaces 102 may also be at the inner side 72 of the primary seal device 50. Each projection inner surface 102 may be an arcuate surface. Each projection inner surface 102, for example, may have an arcuate sectional geometry when viewed, for example, in a plane perpendicular to the axial centerline 32; e.g., the plane of FIG. 5. The projection inner surfaces 102 are configured to be arranged in close proximity with (but not touch) and thereby sealingly mate with the outer seal land surface 48 in a non-contact manner (see FIG. 1), where the rotating structure 36 projects axially through (or into) the inner bore formed by the seal shoes 64.

Each of the seal shoe projections 86 extends axially between opposing projection end surfaces 104. Each of these end surfaces 104 extends radially between and may be contiguous with a respective one of the projection inner surfaces 102 and a respective one of the base inner surfaces 92.

Each of the seal shoe projections 86 of FIG. 4 has the same radial height. In other embodiments, however, one or more of the seal shoe projections 86 may have a different radial height than at least another one of the seal shoe projections 86; e.g., see FIG. 6.

Referring again to FIG. 4, the aperture 88 may be located axially along the centerline 32 between the grouping 96 of the seal shoe projections 86 and the seal shoe second side 82. The aperture 88 of FIG. 4, for example, is located approximately midway axially between the seal shoe projection 86D and the seal shoe second side 82. The aperture 88 may also or alternatively be located axially between the axial center 100 and the seal shoe second side 82.

The aperture 88 extends radially relative to the centerline 32 completely through the respective seal shoe 64 and its seal shoe base 84. The aperture 88 thereby fluidly couples an inner space 106 below the respective seal shoe 64 with an outer space 108 above the respective seal shoe 64. The aperture 88 may thereby provide the respective seal shoe 64 with an effective axial seal shoe length 110 that is shorter than an actual axial seal shoe length 112 of the respective seal shoe 64 along the centerline 32 between the seal shoe first side 80 and the seal shoe second side 82.

Referring to FIG. 3, the spring elements 66 are arranged circumferentially about the axial centerline 32 in an annular array. Referring to FIGS. 4 and 5, the spring elements 66 are also arranged (e.g., radially) between the seal shoes 64 and the seal base 62. Each of the spring elements 66 is configured to moveably and resiliently connect a respective one of the seal shoes 64 to the seal base 62.

The spring element 66 of FIG. 5 includes first and second mounts 114 and 116 (e.g., radial fingers/projections) and one or more spring beams 118A and 118B (generally referred to as "118"). The first mount 114 is (e.g., directly) connected to a respective one of the seal shoes 64 at (e.g., on, adjacent or proximate) the seal shoe first end 76, where the opposing seal shoe second end 78 is free floating (e.g., the seal shoe 64 is cantilevered from the first mount 114). The first mount 114 projects radially outward from the seal shoe base 84. The second mount 116 is (e.g., directly) connected to the seal base 62, and is generally circumferentially aligned with or near the seal shoe second end 78. The second mount 116 is therefore disposed a circumferential distance from the first mount 114. The second mount 116 projects radially inward from the seal base 62.

The spring beams 118 are configured as resilient, biasing members of the primary seal device 50. The spring beams 118 of FIG. 5, for example, are configured as cantilevered-leaf springs. These spring beams 118 may be radially stacked and spaced apart from one another so as to form a four bar linkage with the first mount 114 and the second mount 116. More particularly, each of the spring beams 118 is (e.g., directly) connected to the first mount 114 and the second mount 116. Each of the spring beams 118 extends laterally (e.g., circumferentially or tangentially) between and to the first mount 114 and the second mount 116. The spring beams 118 of FIG. 5 may thereby laterally overlap a major circumferential portion (e.g., ~65-95%) of the respective seal shoe 64.

During operation of the primary seal device 50 of FIG. 1, rotation of the rotating structure 36 may develop aerodynamic forces and apply a fluid pressure to the seal shoes 64 causing each seal shoe 64 to respectively move radially relative to the outer seal land surface 48. The fluid velocity may increase as a gap between a respective seal shoe 64 and the outer seal land surface 48 increases, thus reducing pressure in the gap and drawing the seal shoe 64 radially inwardly toward the outer seal land surface 48. As the gap closes, the velocity may decrease and the pressure may increase within the gap, thus, forcing the seal shoe 64 radially outwardly from the outer seal land surface 48. The respective spring element 66 and its spring beams 118 may deflect and move with the seal shoe 64 to enable provision of a primary seal of the gap between the outer seal land surface 48 and seal shoe projections 86 within predetermined design tolerances.

Referring to FIG. 4, the aperture 88 enables fluid (e.g., gas) to flow between the inner space 106 and the outer space 108. Thus, as the respective seal shoe 64 moves radially inward, some of the fluid within the inner space 106 may move outward into the outer space 108. Conversely, as the respective seal shoe 64 moves radially outward, some of the fluid within the outer space 108 may move inward into the inner space 106. The aperture 88 and the resulting reduced effective axial seal shoe length 110 may thereby enable improved damping of the radial movement of the respective seal shoe 64, particularly relative to a seal shoe configured without a through-hole and, thus, with a longer effective axial seal shoe length; i.e., the actual seal shoe length.

Referring again to FIG. 1, while the primary seal device 50 described above is operable to generally seal the annular gap 40 between the stationary structure 34 and the rotating structure 36, the fluid (e.g., gas) may still flow axially through passages defined by the radial air gaps 120A-C (generally referred to as "120") between the elements 62, 118A and 118B. The secondary seal devices 52 therefore are provided to seal off these passages and, thereby, further and more completely seal the annular gap 40.

Each of the secondary seal devices 52 may be configured as a ring seal element such as, but not limited to, a split ring. Alternatively, one or more of the secondary seal devices 52 may be configured as a full hoop body ring, an annular brush seal or any other suitable ring-type seal.

The secondary seal devices 52 of FIG. 1 are arranged together in an axial stack. In this stack, each of the secondary seal devices 52 axially engages (e.g., contacts) another adjacent one of the secondary seal devices 52. The stack of the secondary seal devices 52 is arranged with the first ring structure 54, which positions and mounts the secondary seal devices 52 with the stationary structure 34 adjacent the primary seal device 50. In this arrangement, the stack of the secondary seal devices 52 is operable to axially engage and form a seal between the side surfaces 94 of the seal shoes 64 and an annular surface 122 of the first ring structure 54. These surfaces 94 and 122 are axially aligned with one another, which enables the stack of the secondary seal devices 52 to slide radially against, but maintain a seal engagement with, the side surfaces 94 as the seal shoes 64 move radially relative to the outer seal land surface 48 as described above.

The first ring structure 54 may include a secondary seal device support ring 124 and a retention ring 126. The support ring 124 is configured with an annular full hoop body, which extends circumferentially around the axial centerline 32. The support ring 124 includes the annular surface 122, and is disposed axially adjacent and engaged with the seal base 62.

The retention ring 126 is configured with an annular full hoop body, which extends circumferentially around the axial centerline 32. The retention ring 126 is disposed axially adjacent and is engaged with the support ring 124, thereby capturing the stack of the secondary seal devices 52 within an annular channel formed between the rings 124 and 126. The stack of the secondary seal devices 52, of course, may also or alternatively be attached to one of the rings 124 and 126 by, for example, a press fit connection and/or otherwise.

In some embodiments, referring to FIGS. 7A and 7B, the aperture 88 may extend axially within (e.g., not into or through) the respective seal shoe 64 and its seal shoe base 84. The aperture 88 of FIGS. 7A and 7B, for example, extends axially along the centerline 32 within the seal shoe base 84 between an axial aperture first (e.g., upstream) side surface 128 and an axial aperture second (e.g., downstream) side surface 130, where the aperture second side surface 130 is arranged axially opposite the aperture first side surface 128.

Figure 8:
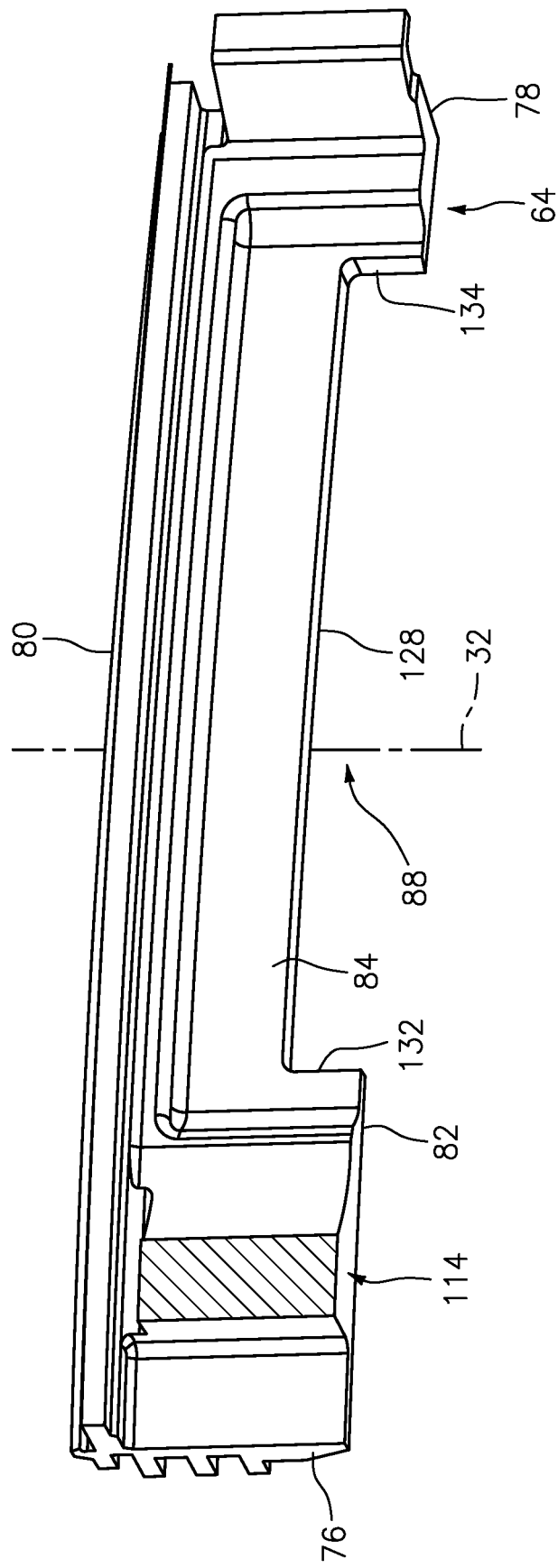
FIG. 8 is a perspective illustration of the seal shoe configured with an alternative aperture.

In some embodiments, referring to FIG. 8, the aperture 88 may extend axially into the respective seal shoe 64 and its seal shoe base 84. The aperture 88 of FIG. 8, for example, extends axially along the centerline 32 into the seal shoe base 84 from the seal shoe second side 82 to the aperture first side surface 128. The aperture 88 may thereby form a notch or a groove in the respective seal shoe 64 and its seal shoe base 84.

In some embodiments, referring to FIGS. 7A, 7B and 8, the aperture 88 extends laterally within the respective seal shoe 64 and its seal shoe base 84. The aperture 88 of FIGS. 7A, 7B and 8, for example, extends laterally (e.g., circumferentially about the centerline 32) within the seal shoe base 84 between a lateral aperture first side surface 132 and a lateral aperture second side surface 134, where the aperture second side surface 134 is arranged laterally opposite the aperture first side surface 132. The aperture first side surface 132 extends axially between and is connected to the side surfaces 128 and 130. The aperture second side surface 134 extends axially between and is connected to the side surfaces 128 and 130.

Figure 9:
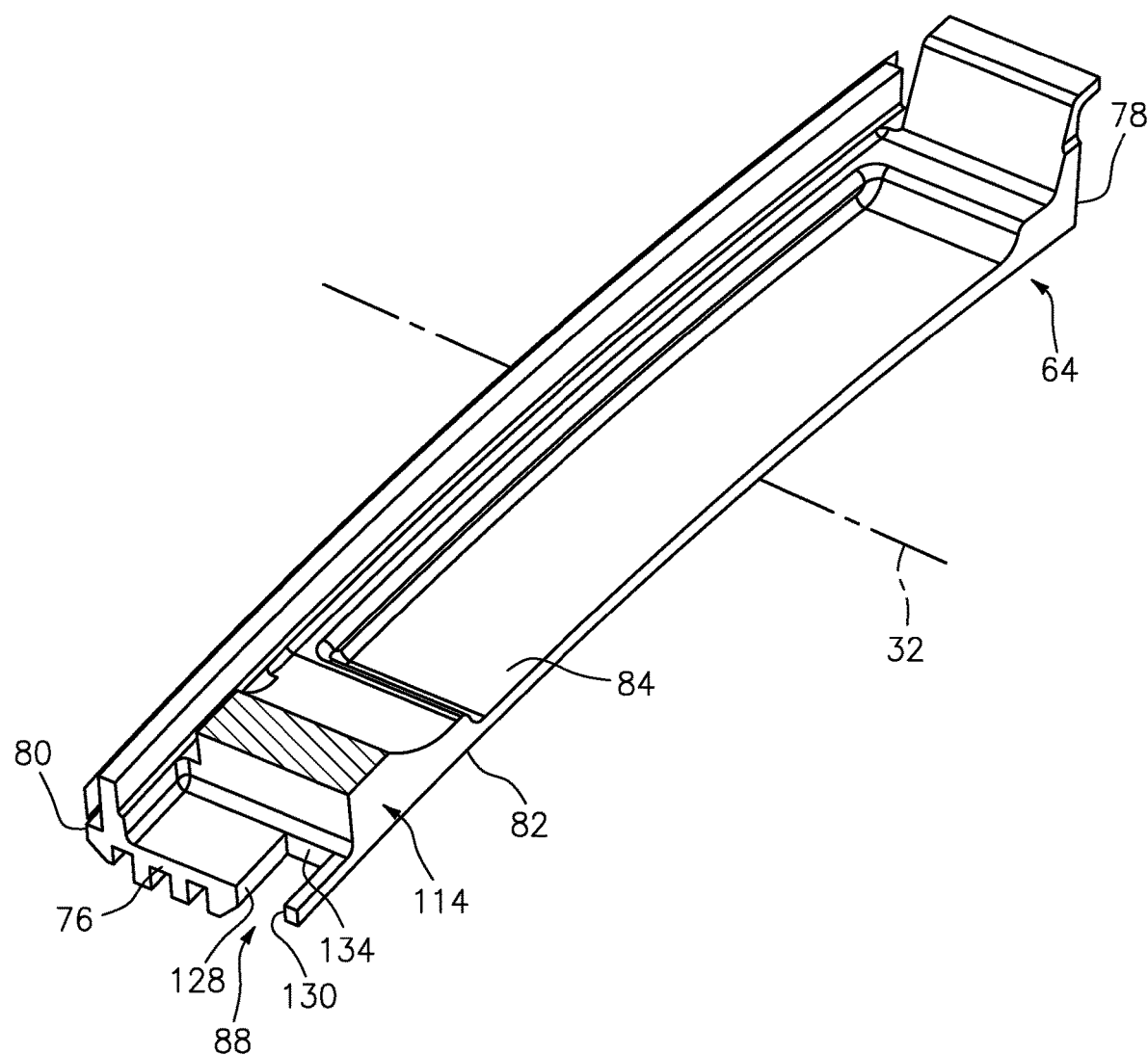
FIG. 9 is a perspective illustration of the seal shoe configured with another alternative aperture.
Figure 10:
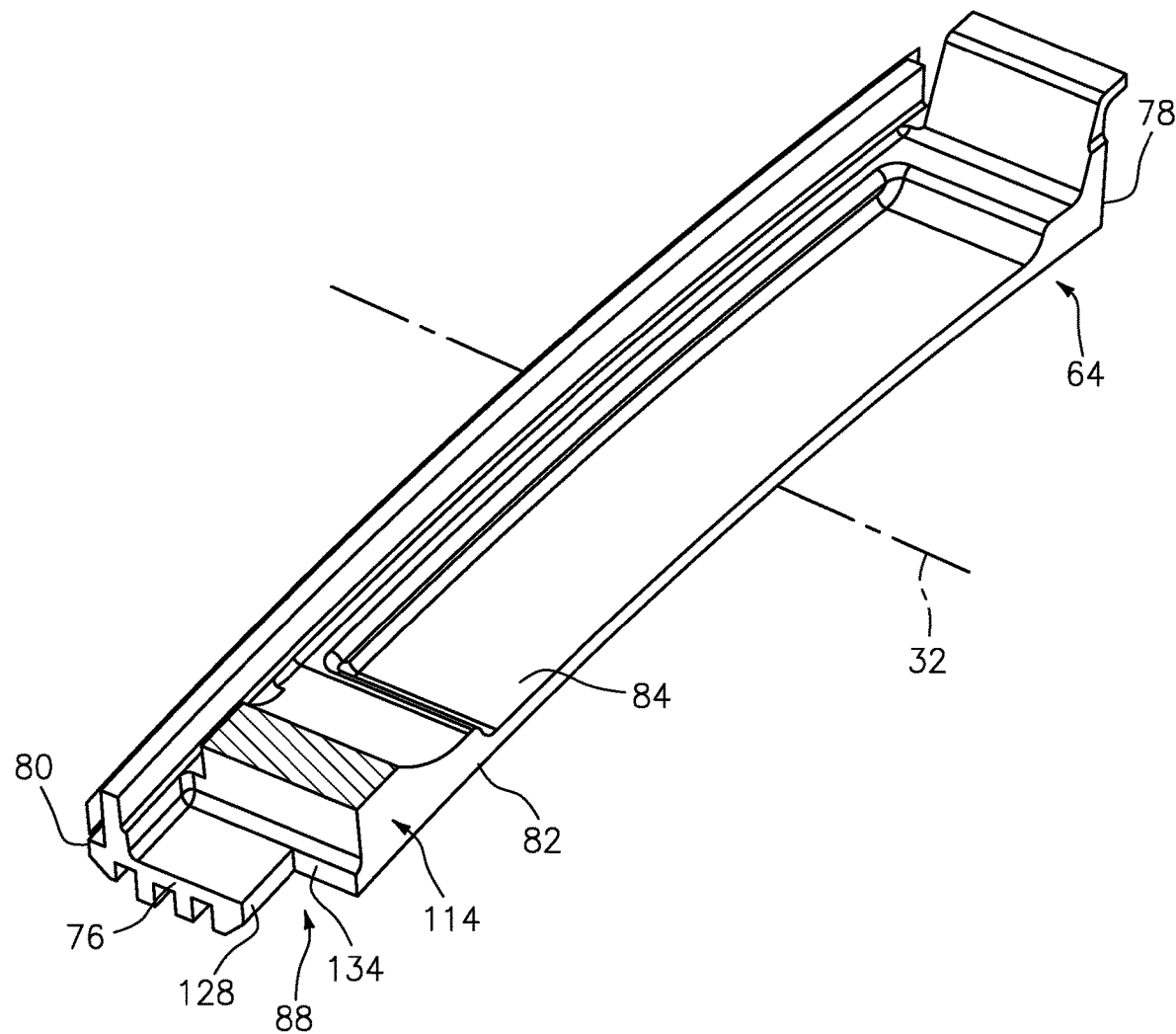
FIG. 10 is a perspective illustration of the seal shoe configured with still another alternative aperture.

In some embodiments, referring to FIGS. 9 and 10, the aperture 88 may extend laterally into the respective seal shoe 64 and its seal shoe base 84. The aperture 88 of FIGS. 9 and 10, for example, extends laterally into the seal shoe base 84 from the seal shoe first end 76 to the aperture second side surface 134. The aperture 88 may thereby form a notch or a groove in the respective seal shoe 64 and its seal shoe base 84.

In some embodiments, referring to FIG. 5, the aperture 88 may be located laterally between the first mount 114 and the second mount 116.

Figure 11:
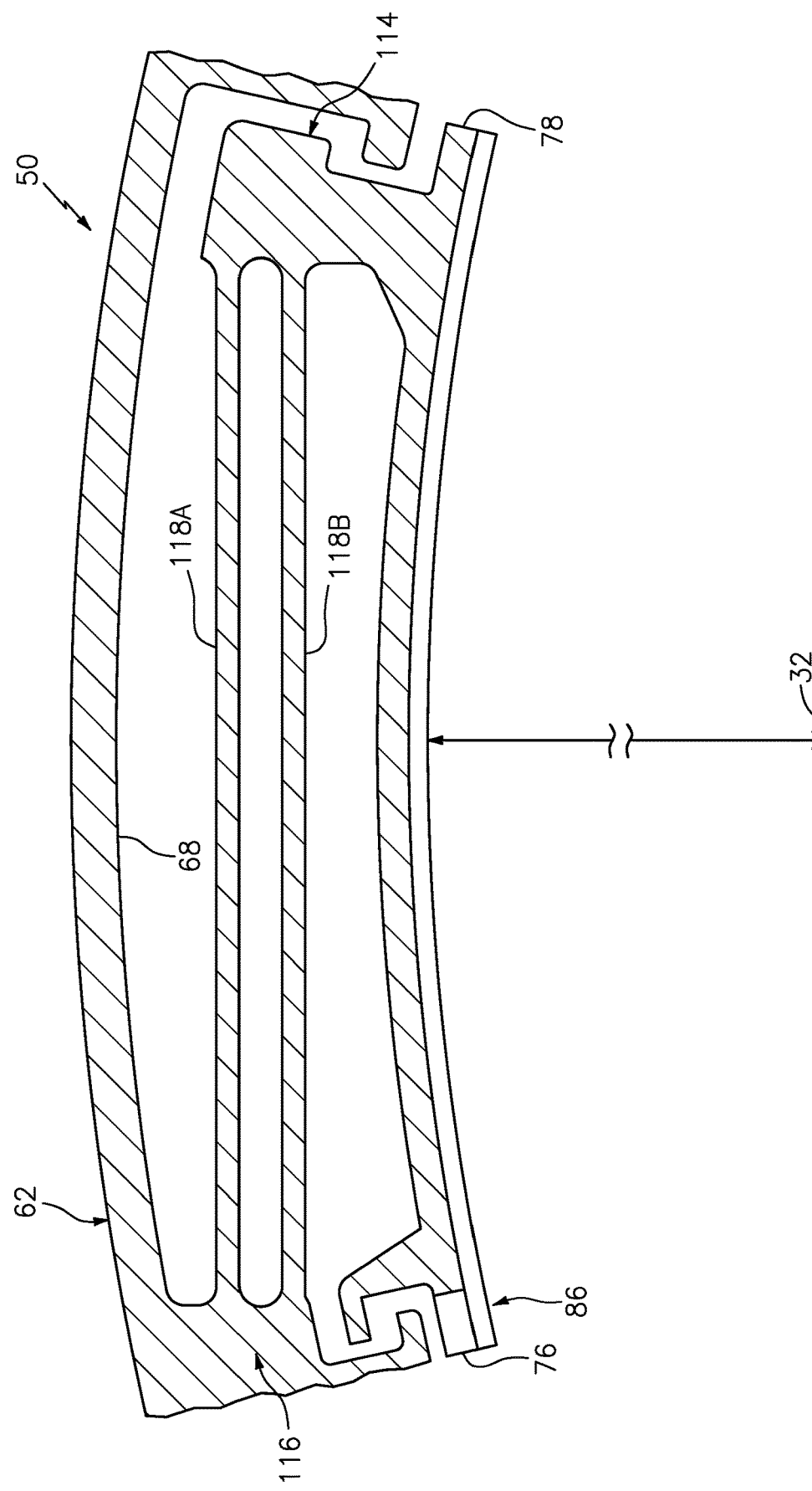
FIG. 11 is a cross-sectional illustration of a portion of the primary seal device configured with the seal shoe of FIG. 10.
Figure 14:
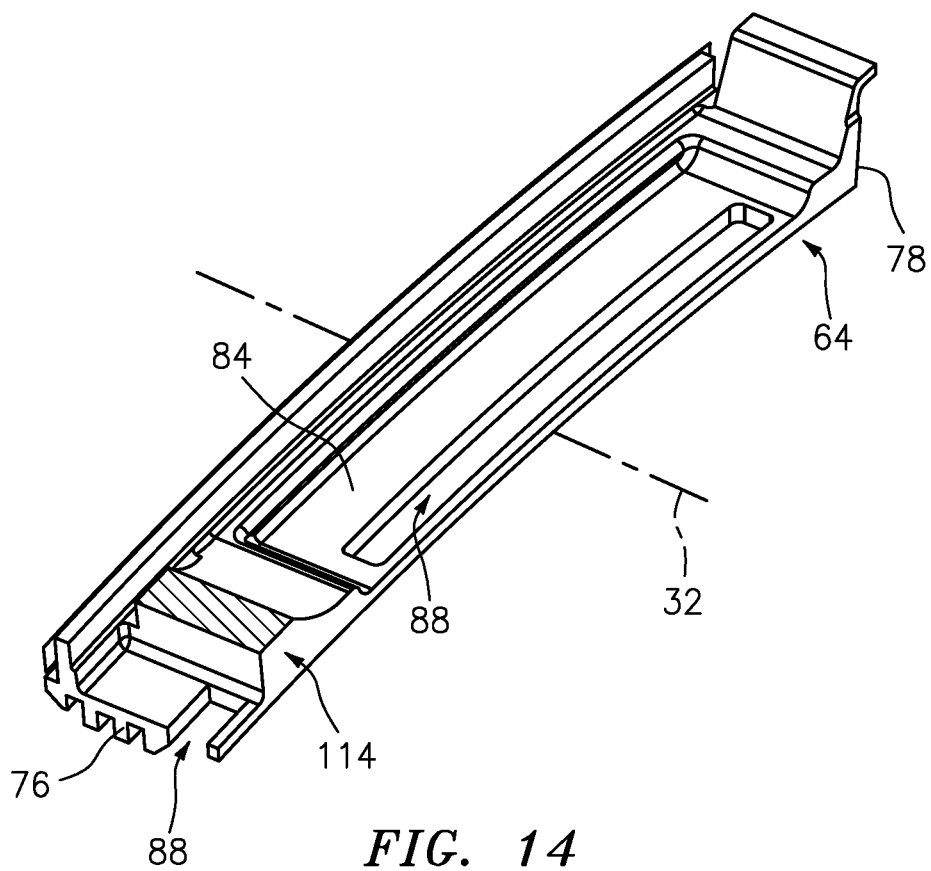
FIG. 14 is a perspective illustration of the seal shoe configured with other alternative apertures.
Figure 15:
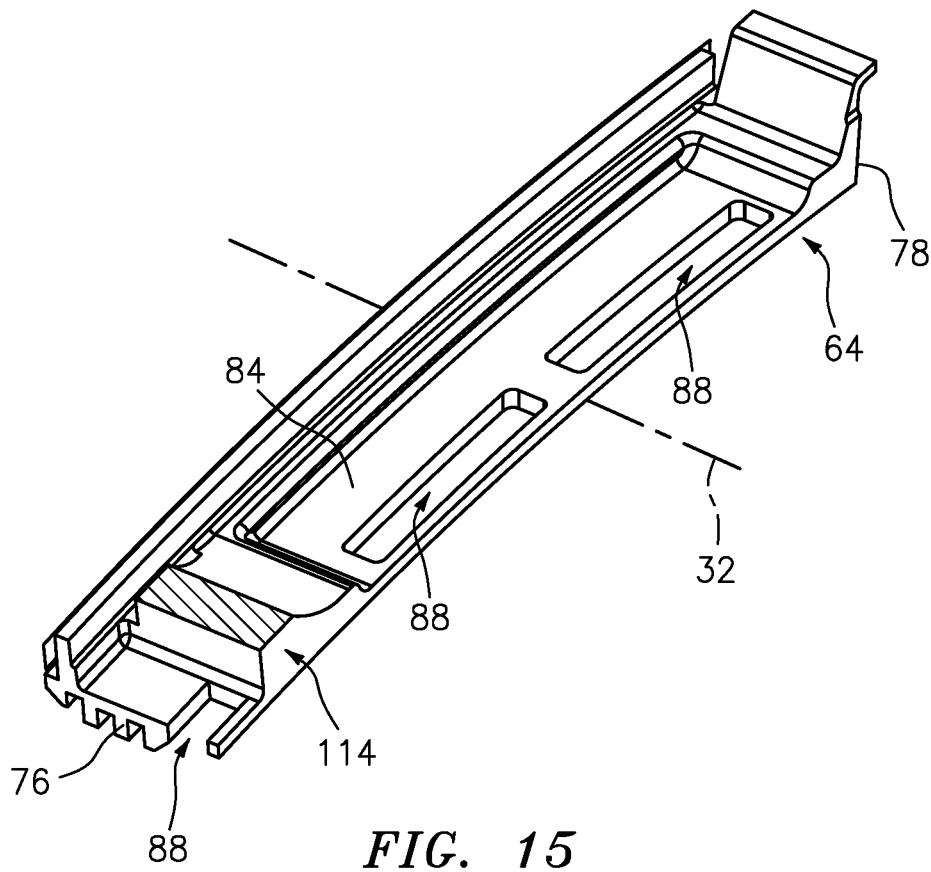
FIG. 15 is a perspective illustration of the seal shoe configured with other alternative apertures.
Figure 16:
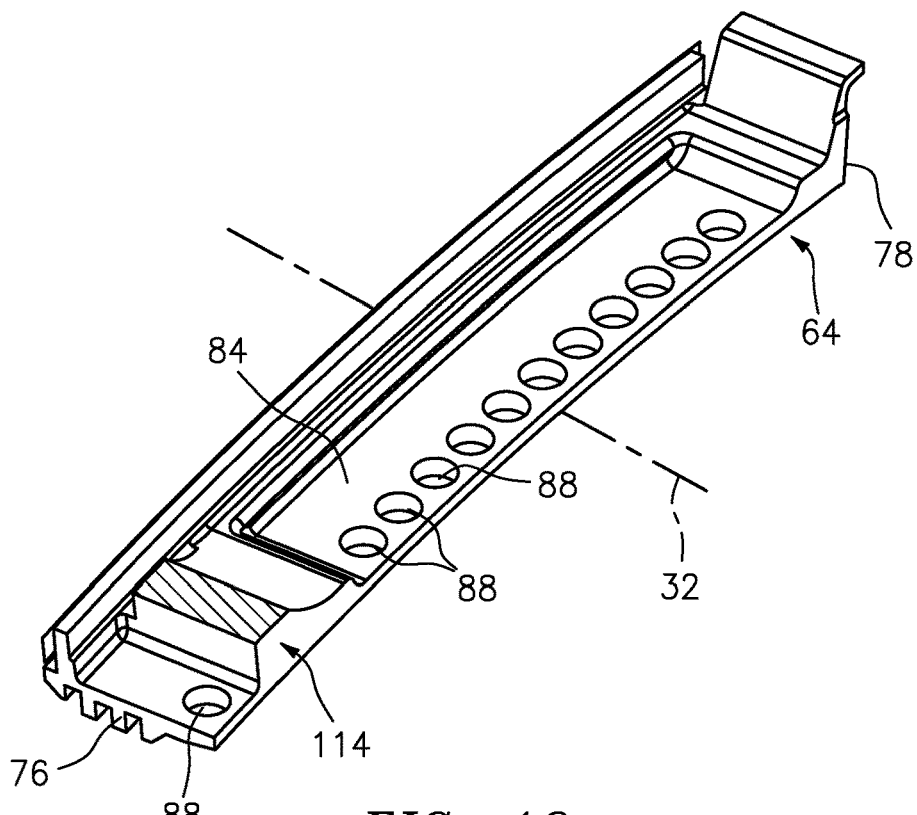
FIG. 16 is a perspective illustration of the seal shoe configured with other alternative apertures.
Figure 17:
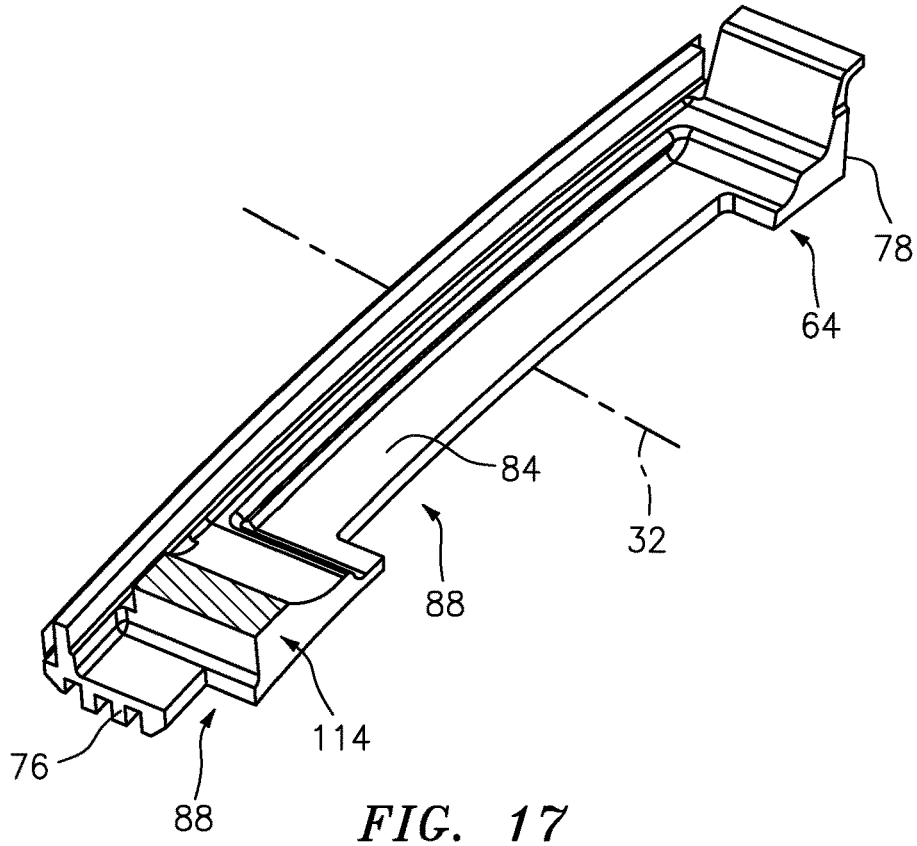
FIG. 17 is a perspective illustration of the seal shoe configured with still other alternative apertures.

In some embodiments, referring to FIG. 11, the first mount 114 may be located laterally between the aperture 88 and the second mount 116.

In some embodiments, referring to FIGS. 12A, 12B, 13A, 13B and 14-17, the aperture 88 may be one of a plurality of apertures 88 configured in the respective seal shoe 64 and its seal shoe base 84. Each of these apertures 88 may extend radially through the respective seal shoe 64 and its seal shoe base 84. Some or all of the apertures 88 may be arranged in a (e.g., straight) linear array. The aperture 88, for example, may be axially aligned with one another along the centerline 32; however, the present disclosure is not limited to such an exemplary arrangement.

In the embodiments of FIGS. 12A and 13A, each of the apertures 88 is located laterally between the first mount 114 and the second mount 116 (not visible; see FIG. 4). In the embodiments of FIGS. 14-17, the first mount 114 is located laterally between (A) at least one of the apertures 88 and (B) the second mount 116 (not visible; see FIG. 4).

Figure 18:
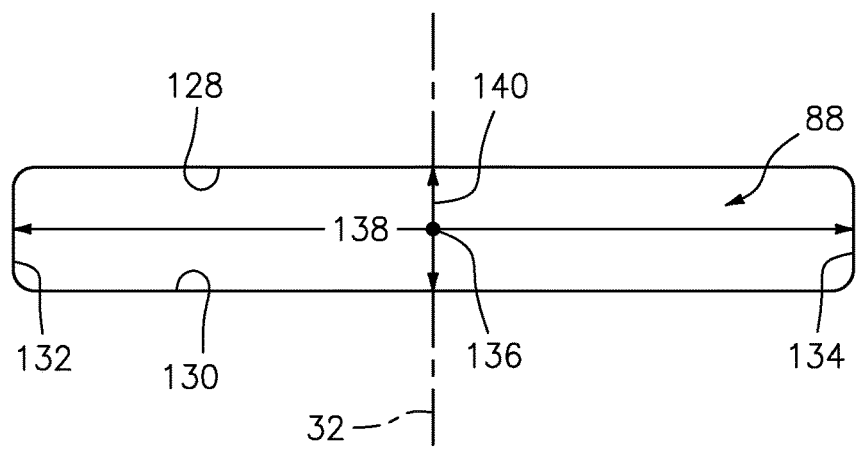
FIG. 18 is a schematic illustration of an elongated aperture for the seal shoe.

In some embodiments, referring to FIG. 18, one or more or each aperture 88 is configured with an elongated cross-sectional geometry when viewed, for example, in a plane perpendicular to a centerline axis 136 of the aperture 88; e.g., plane of FIG. 18. This elongated cross-sectional geometry may be laterally elongated as shown in FIG. 18. The aperture 88 of FIG. 18, for example, has a laterally extending major axis 138 and an axially extending minor axis 140. A length of the major axis 138 may be at least two, five, ten, fifteen, twenty or more times a length of the minor axis 140. The present disclosure, however, is not limited to the foregoing major-minor axes orientation or dimensional relationship.

Figure 19:
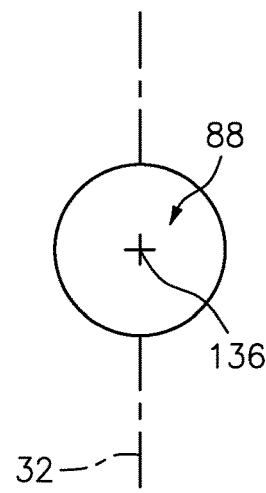
FIG. 19 is a schematic illustration of a circular aperture for the seal shoe.

In some embodiments, referring to FIG. 19, one or more or each aperture 88 is configured with a non-elongated (e.g., circumferentially symmetrical) cross-sectional geometry when viewed, for example, in a plane perpendicular to the centerline axis 136 of the aperture 88; e.g., plane of FIG. 19. The aperture 88 of FIG. 19, for example, is configured with a circular cross-sectional geometry. In other embodiments, however, the aperture 88 may be configured with a square cross-sectional geometry or any other shape (e.g., equilateral triangle, star, etc.) cross-sectional geometry that is symmetric about a center point; e.g., the centerline axis 136 of the aperture 88.

Figure 20:
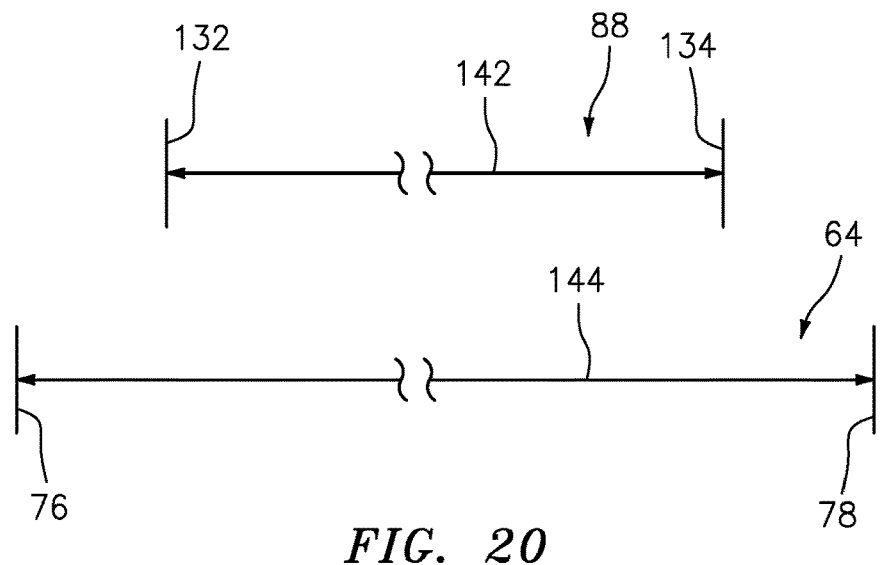
FIG. 20 is a schematic illustration representing lengths of an aperture and a seal shoe.

Referring to FIG. 20, each aperture 88 has a lateral length 142 (e.g., minor axis length); e.g., a length laterally between the side surfaces 132 and 134. This lateral aperture length 142 is sized to be smaller than a lateral seal shoe length 144; e.g., the length laterally between the seal shoe ends 76 and 78. In some embodiments, the lateral aperture length 142 may be between about (e.g., +/−1%) fifty percent (50%) and about eighty percent (80%) of the seal shoe length 144; e.g., see FIGS. 7A and 7B. In some embodiments, the lateral aperture length 142 may be between about ten percent (10%) and about fifty percent (50%) of the seal shoe length 144; e.g., see FIGS. 12A and 12B. In some embodiments, the lateral aperture length 142 may be between about one percent (1%) and about ten percent (10%) of the seal shoe length 144; e.g., see FIGS. 13A and 13B. The present disclosure, however, is not limited to the foregoing exemplary aperture-seal shoe dimensional relationships.

The primary seal device 50 and some or all of its elements (e.g., 62, 64 and 66) may be configured as a monolithic body. However, the present disclosure is not limited to such a primary seal device construction.

Figure 21:
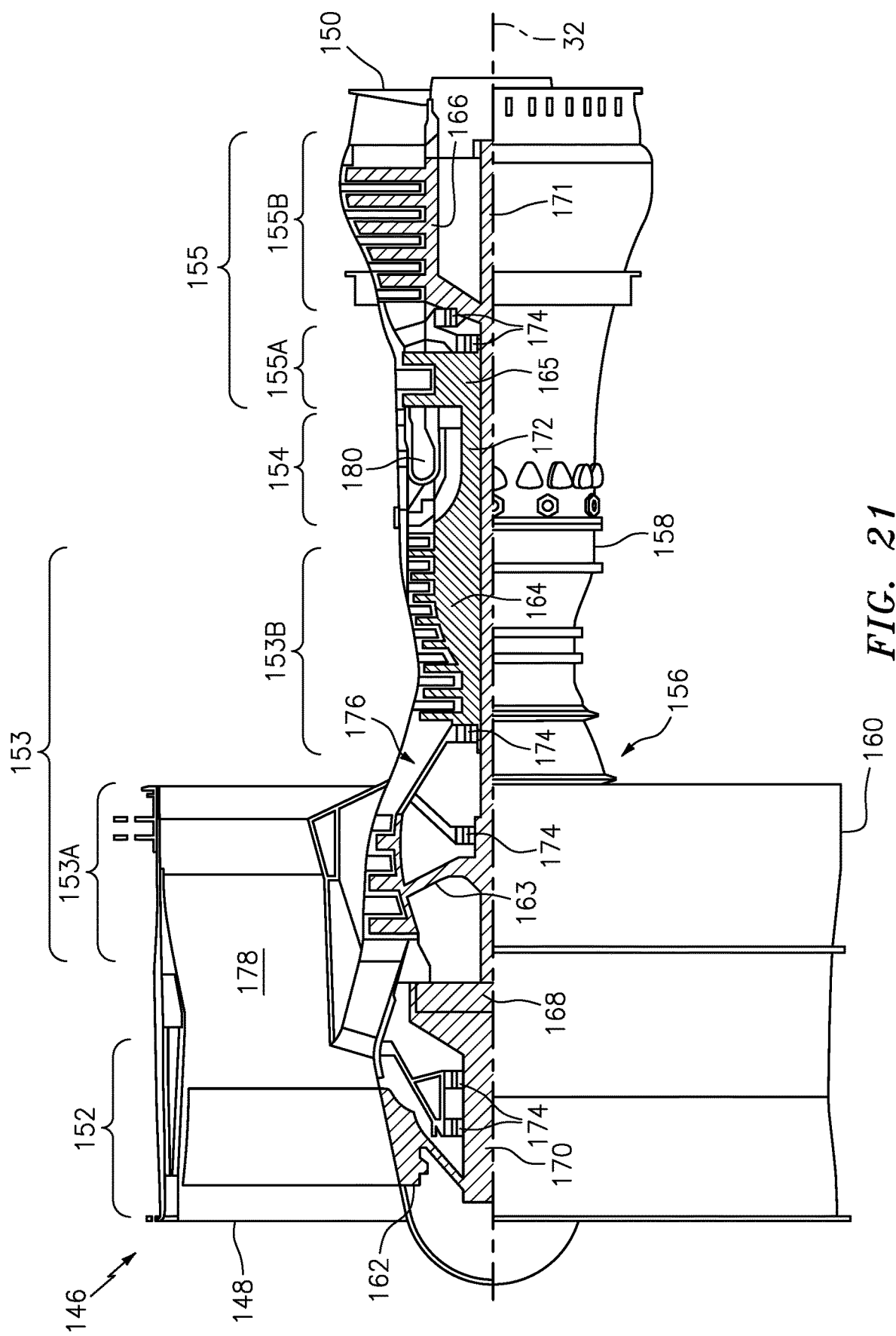
FIG. 21 is a side cutaway illustration of a gas turbine engine which may be configured with the rotational equipment assembly.

As described above, the rotational equipment assembly 30 of the present disclosure may be configured with various different types and configurations of rotational equipment. FIG. 21 illustrates one such type and configuration of the rotational equipment-a geared turbofan gas turbine engine 146. Such a turbine engine includes various stationary structures (e.g., bearing supports, hubs, cases, etc.) as well as various rotors (e.g., rotor disks, shafts, shaft assemblies, etc.) as described below, where the stationary structure 34 and the rotating structure 36 can respectively be configured as anyone of the foregoing structures in the turbine engine 146 of FIG. 21, or other structures not mentioned herein.

The turbine engine 146 of FIG. 21 extends along the axial centerline 32 between an upstream airflow inlet 148 and a downstream airflow exhaust 150. The turbine engine 146 includes a fan section 152, a compressor section 153, a combustor section 154 and a turbine section 155. The compressor section 153 includes a low pressure compressor (LPC) section 153A and a high pressure compressor (HPC) section 153B. The turbine section 155 includes a high pressure turbine (HPT) section 155A and a low pressure turbine (LPT) section 155B.

The engine sections 152-155B are arranged sequentially along the axial centerline 32 within an engine housing 156. This engine housing 156 includes an inner case 158 (e.g., a core case) and an outer case 160 (e.g., a fan case). The inner case 158 may house one or more of the engine sections 153A-155B; e.g., an engine core. The outer case 160 may house at least the fan section 152.

Each of the engine sections 152, 153A, 153B, 155A and 155B includes a respective rotor 162-166. Each of these rotors 162-166 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 162 is connected to a gear train 168, for example, through a fan shaft 170. The gear train 168 and the LPC rotor 163 are connected to and driven by the LPT rotor 166 through a low speed shaft 171. The HPC rotor 164 is connected to and driven by the HPT rotor 165 through a high speed shaft 172. The shafts 170-172 are rotatably supported by a plurality of bearings 174. Each of these bearings 174 is connected to the engine housing 156 by at least one stationary structure such as, for example, an annular support strut.

During operation, air enters the turbine engine 146 through the airflow inlet 148. This air is directed through the fan section 152 and into a core gas path 176 and a bypass gas path 178. The core gas path 176 extends sequentially through the engine sections 153A-155B. The air within the core gas path 176 may be referred to as "core air". The bypass gas path 178 extends through a bypass duct, which bypasses the engine core. The air within the bypass gas path 178 may be referred to as "bypass air".

The core air is compressed by the compressor rotors 163 and 164 and directed into a combustion chamber 180 of a combustor in the combustor section 154. Fuel is injected into the combustion chamber 180 and mixed with the compressed core air to provide a fuel-air mixture. This fuel air mixture is ignited and combustion products thereof flow through and sequentially cause the turbine rotors 165 and 166 to rotate. The rotation of the turbine rotors 165 and 166 respectively drive rotation of the compressor rotors 164 and 163 and, thus, compression of the air received from a core airflow inlet. The rotation of the turbine rotor 166 also drives rotation of the fan rotor 162, which propels bypass air through and out of the bypass gas path 178. The propulsion of the bypass air may account for a majority of thrust generated by the turbine engine 146, e.g., more than seventy-five percent (75%) of engine thrust. The turbine engine 146 of the present disclosure, however, is not limited to the foregoing exemplary thrust ratio.

The assembly 30 may be included in various turbine engines other than the one described above as well as in other types of rotational equipment. The rotational equipment assembly 30, for example, may be included in a geared turbine engine where a gear train connects one or more shafts to one or more rotors in a fan section, a compressor section and/or any other engine section. Alternatively, the rotational equipment assembly 30 may be included in a turbine engine configured without a gear train. The rotational equipment assembly 30 may be included in a geared or non-geared turbine engine configured with a single spool, with two spools (e.g., see FIG. 21), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for rotational equipment, comprising:
a plurality of seal shoes arranged about a centerline in an annular array, the plurality of seal shoes comprising a first seal shoe configured with an aperture that extends radially through the first seal shoe, the first seal shoe extending axially along the centerline between an upstream side of the first seal shoe and a downstream side of the first seal shoe, and the aperture located axially between an axial center of the first seal shoe and the downstream side of the first seal shoe;
a seal base circumscribing the annular array of seal shoes; and
a plurality of spring elements comprising a first spring element;
the first spring element including a first mount, a second mount and a spring beam, the first mount connected to the first seal shoe, the second mount connected to the seal base, and the spring beam extending laterally between and connected to the first mount and the second mount;
wherein each of the plurality of seal shoes includes a plurality of projections extending inwardly from the seal base;
wherein the plurality of projections in a grouping and are solely between the upstream side and the axial center, and the aperture is solely between the axial center and the downstream side such that the aperture is downstream of the grouping of the plurality of projections; and
wherein the aperture is configured with an elongated cross-sectional geometry when viewed in a reference plane perpendicular to a centerline axis of the aperture.

2. The assembly of claim 1, wherein the aperture extends axially within the first seal shoe.

3. The assembly of claim 1, wherein the aperture extends laterally within the first seal shoe.

4. The assembly of claim 1, wherein the aperture extends laterally into the first seal shoe.

5. The assembly of claim 1, wherein the first mount is located laterally between the second mount and the aperture.

6. The assembly of claim 1, wherein the aperture is configured with a circumferentially symmetric cross-sectional geometry.

7. The assembly of claim 1, wherein the aperture is configured with a circular cross-sectional geometry.

8. The assembly of claim 1, wherein the first seal shoe is further configured with a second aperture that extends radially through the first seal shoe.

9. The assembly of claim 1, wherein
the seal base extends axially along the centerline between the upstream side of the first seal shoe and the downstream side of the first seal shoe; and
the aperture extends radially through the seal base.

10. The assembly of claim 9, wherein
the plurality of projections comprises a first projection and a second projection.

11. The assembly of claim 10, wherein
the plurality of projections further comprises a third projection.

12. The assembly of claim 1, wherein
the first seal shoe extends laterally between a first end of the first seal shoe and a second end of the first seal shoe for a seal shoe length; and
the aperture extends laterally for an aperture length which is between fifty percent and eighty percent of the seal shoe length.

13. The assembly of claim 1, wherein
the first seal shoe extends laterally between a first end of the first seal shoe and a second end of the first seal shoe for a seal shoe length; and
the aperture extends laterally for an aperture length which is between ten percent and fifty percent of the seal shoe length.

14. The assembly of claim 1, wherein
the first seal shoe extends laterally between a first end of the first seal shoe and a second end of the first seal shoe for a seal shoe length; and
the aperture extends laterally for an aperture length which is between one percent and ten percent of the seal shoe length.

15. The assembly of claim 1, wherein the first spring element further includes a second spring beam that extends laterally between and is connected to the first mount and the second mount.

16. The assembly of claim 1, further comprising:
a stationary structure;
a rotating structure configured to rotate about the centerline; and
a seal assembly including the plurality of seal shoes, the seal base and the plurality of spring elements, the seal assembly configured to seal a gap between the stationary structure and the rotating structure;
wherein the plurality of seal shoes are arranged circumferentially about and sealingly engage the rotating structure; and
wherein the seal base is mounted to the stationary structure.

17. The assembly of claim 1, further comprising:
a seal assembly configured to seal a gap between the seal base and the first seal shoe;
the seal assembly comprising a seal device configured to axially engage a side surface of the first seal shoe; and
the side surface of the first seal shoe located axially between the upstream side of the first seal shoe and the axial center of the first seal shoe.

* * * * *